US011589377B2

(12) United States Patent
Karaki et al.

(10) Patent No.: US 11,589,377 B2
(45) Date of Patent: *Feb. 21, 2023

(54) CONTROL OF UPLINK RADIO TRANSMISSIONS ON SEMI-PERSISTENTLY ALLOCATED RESOURCES

(71) Applicant: Telefonaktiebolaget LM Ericsson (publ), Stockholm (SE)

(72) Inventors: Reem Karaki, Aachen (DE); Jung-Fu Cheng, Fremont, CA (US); Amitav Mukherjee, Elk Grove, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 15 days.

This patent is subject to a terminal disclaimer.

(21) Appl. No.: 17/229,323

(22) Filed: Apr. 13, 2021

(65) Prior Publication Data

US 2021/0235478 A1 Jul. 29, 2021

Related U.S. Application Data

(63) Continuation of application No. 16/492,968, filed as application No. PCT/EP2017/084049 on Dec. 21, 2017, now Pat. No. 11,019,651.

(Continued)

(51) Int. Cl.
*H04W 72/12* (2009.01)
*H04L 1/1812* (2023.01)
(Continued)

(52) U.S. Cl.
CPC ....... *H04W 72/1284* (2013.01); *H04L 1/1812* (2013.01); *H04W 72/0413* (2013.01); *H04W 72/0453* (2013.01); *H04W 72/14* (2013.01)

(58) Field of Classification Search
CPC .......... H04W 72/042; H04W 72/0413; H04W 72/0453; H04W 72/1284; H04W 72/14;
(Continued)

(56) References Cited

U.S. PATENT DOCUMENTS

2014/0036853 A1  2/2014 Kim et al.
2016/0050667 A1  2/2016 Papasakellariou et al.
(Continued)

FOREIGN PATENT DOCUMENTS

EP     3128798 A1      2/2017
KR     20140010450 A   1/2014
KR     20170015969 A   2/2017

OTHER PUBLICATIONS

Nokia et al., "Feedback for SPS activation/deactivation", 3GPP TSG-RAN WG2 Meeting #94, May 23-27, 2016, pp. 1-8, Nanjing, China, R2-163698.

(Continued)

*Primary Examiner* — Kan Yuen
(74) *Attorney, Agent, or Firm* — Coats & Bennett, PLLC

(57) ABSTRACT

A radio device receives control information from a node of the wireless communication network. The control information is used for controlling semi-persistent allocation of radio resources of an unlicensed frequency spectrum. Based on the control information, the radio device controls at least one UL radio transmission on the radio resources of the unlicensed frequency spectrum.

21 Claims, 10 Drawing Sheets

Related U.S. Application Data

(60) Provisional application No. 62/476,089, filed on Mar. 24, 2017.

(51) Int. Cl.
    *H04W 72/04* (2023.01)
    *H04W 72/0453* (2023.01)
    *H04W 72/14* (2009.01)

(58) Field of Classification Search
    CPC .. H04W 74/0808; H04W 16/14; H04L 1/1812
    See application file for complete search history.

(56) References Cited

U.S. PATENT DOCUMENTS

| | | | |
|---|---|---|---|
| 2016/0119969 | A1 | 4/2016 | Vajapeyam et al. |
| 2016/0192388 | A1 | 6/2016 | Ekpenyong et al. |
| 2017/0048884 | A1* | 2/2017 | Jung ................ H04L 5/001 |
| 2017/0215157 | A1 | 7/2017 | Yang et al. |
| 2017/0332358 | A1* | 11/2017 | Park .............. H04W 72/1289 |
| 2018/0175975 | A1 | 6/2018 | Um et al. |
| 2018/0324891 | A1* | 11/2018 | Wakabayashi ........ H04W 76/28 |

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 12)", Technical Specification, 3GPP TS 36.211 V12.3.0, Sep. 1, 2014, pp. 1-124, 3GPP.

3rd Generation Partnership Project, "3rd Generation Partnership Project; Technical Specification Group Radio Access Network; Evolved Universal Terrestrial Radio Access (E-UTRA); Physical Layer Procedures (Release 12)", Technical Specification, 3GPP TS 36.213 V12.3.0, Sep. 1, 2014, pp. 1-212, 3GPP.

3rd Generation Partnership Project, "3rd Generation Partnership Project; Technical Specification Group Radio Access Network; Evolved Universal Terrestrial Radio Access (E-UTRA); Medium Access Control (MAC) Protocol Specification (Release 12)", Technical Specification, 3GPP TS 36.321 V12.1.0, Mar. 1, 2014, pp. 1-57, 3GPP.

3rd Generation Partnership Project, "3rd Generation Partnership Project; Technical Specification Group Radio Access Network; Study on Licensed-Assisted Access to Unlicensed Spectrum (Release 13)", Technical Report, 3GPP TR 36.889 V13.0.0, Jun. 1, 2015, pp. 1-285, 3GPP.

MulteFire Alliance, "MulteFire Release 1.0 Technical Paper", Jan. 20, 2017, pp. 1-25, retrieved on Sep. 5, 2019, retrieved from internet: https://www.multefire.org/wp-content/uploads/MulteFire-Release-1.0-whitepaper_FINAL.pdf.

ETSI, "5 GHz RLAN; Harmonised Standard Covering the Essential Requirements of Article 3.2 of Directive 2014/53/EU", Harmonised European Standard, ETSI EN 301 893 V2.1.0, Mar. 1, 2017, pp. 1-120, ETSI.

3rd Generation Partnership Project, "3rd Generation Partnership Project; Technical Specification Group Radio Access Network; Evolved Universal Terrestrial Radio Access (E-UTRA); Radio Resource Control (RRC) Protocol Specification (Release 14)", Technical Specification, 3GPP TS 36.331 V14.1.0, Dec. 1, 2016, pp. 1-654, 3GPP.

3rd Generation Partnership Project, "3rd Generation Partnership Project; Technical Specification Group Radio Access Network; Evolved Universal Terrestrial Radio Access (E-UTRA); Multiplexing and Channel Coding (Release 14)", Technical Specification, 3GPP TS 36.212 V14.1.1, Jan. 1, 2017, pp. 1-149, 3GPP.

3rd Generation Partnership Project, "3rd Generation Partnership Project; Technical Specification Group Radio Access Network; Evolved Universal Terrestrial Radio Access (E-UTRA); Medium Access Control (MAC) Protocol Specification (Release 14)", Technical Specification, 3GPP TS 36.321 V14.1.0, Dec. 1, 2016, pp. 1-98, 3GPP.

Qualcomm Incorporated, "Control Details for UL in LAA", 3GPP TSG RAN WG1 #84, St. Julian's, Malta, Feb. 15, 2016, pp. 1-5, R1-160885, 3GPP.

Ericsson et al., "Sidelink SPS Configuration", 3GPP TSG-RAN WG2 #96, Reno, USA, Nov. 14, 2016, pp. 1-6, R2-168702, 3GPP.

ZTE, "Discussion on Grant-Free Transmission Based on Sensing", 3GPP TSG RAN WG1 Meeting #86bis, Lisbon, Portugal, Oct. 10, 2016, pp. 1-4, R1-1609801, 3GPP.

3rd Generation Partnership Project, "3rd Generation Partnership Project; Technical Specification Group Radio Access Network; Evolved Universal Terrestrial Radio Access (E-UTRA); Physical Layer Procedures (Release 12)", Technical Specification, 3GPP TS 36.213 V12.6.0, Jun. 1, 2015, pp. 1-241, 3GPP.

The European Telecommunications Standards Institute, "5 GHz RLAN; Harmonised Standard Covering the Essential Requirements of Article 3.2 of Directive 2014/53/EU", Draft ETSI EN 301 893 V2.0.7, Nov. 1, 2016, pp. 1-123, ETSI.

3rd Generation Partnership Project, "3rd Generation Partnership Project; Technical Specification Group Radio Access Network; Evolved Universal Terrestrial Radio Access (E-UTRA); Multiplexing and Channel Coding (Release 12)", Technical Specification, 3GPP TS 36.212 V12.6.0, Sep. 1, 2015, pp. 1-95, 3GPP.

Afrin, N. et al., "Design of a Buffer and Channel Adaptive LTE Semi-Persistent Scheduler for M2M Communications", IEEE ICC 2015—Next Generation Networking Symposium, Jun. 8, 2015, pp. 5821-5826, IEEE.

\* cited by examiner

| | DCI format 0A | DCI format 4A | Comments |
|---|---|---|---|
| TPC command for scheduled PUSCH | set to '00' | set to '00' | Fixed |
| Cyclic shift DM RS | - | - | Controlled by eNB |
| Modulation and coding scheme | - | - | Controlled by eNB |
| HARQ process number | Set to 0s | Set to 0s | Fixed |
| Redundancy version | Set to 0s | Set to 0s | Fixed, (eNB assumes zero unless stated by UE) |
| PUSCH trigger A | Set to 0s | Set to 0s | Fixed |
| Flag for format0A/format1A differentiation | | N/A | 0A |
| Resource block assignment | - | - | Controlled by eNB |
| New data indicator | 0 | 0 | Fixed |
| CSI request | - | - | Controlled by eNB |
| HARQ ACK request (if present) | - | - | |
| SRS request | - | - | Controlled by eNB |
| PUSCH starting position | - | - | Controlled by eNB |
| PUSCH ending symbol | - | - | Controlled by eNB |
| Channel Access type | Set to 0s | Set to 0s | Controlled by UE |
| Channel Access Priority Class | Set to 0s | Set to 0s | Controlled by UE |
| CIF | - | | Controlled by eNB, Field is presented if cross carrier scheduling is activated |
| Modulation and coding scheme, for TB2 | N/A | - | Controlled by eNB |
| Redundancy version for TB2 | N/A | Set to 0s | Fixed, (eNB assumes zero unless stated by UE) |
| Timing offset | Set to 0s | Set to 0s | Fixed |

FIG. 5A

|  | DCI format 0A | DCI format 0 | DCI format 4A |
|---|---|---|---|
| TPC command for scheduled PUSCH | set to '00' | set to '00' | set to '00' |
| Cyclic shift DM RS | Set to 0s | Set to 0s | Set to 0s |
| Modulation and coding scheme | Set to 1s | Set to 1s | Set to 1s |
| HARQ process number | Set to 0s | N/A | Set to 0s |
| Redundancy version | Set to 0s | N/A | Set to 0s |
| Carrier indicator | - | - | - |
| PUSCH trigger A | Set to 0s | N/A | Set to 0s |
| Flag for format0A/format1A differentiation | - | N/A | - |
| Resource block assignment | Set to 1s | N/A | Set to 1s |
| New data indicator | 0 | 0 | 0 |
| CSI request | Set to 0s | Set to 0s | Set to 0s |
| HARQ ACK request (if present) | Set to 0 | N/A | Set to 0 |
| SRS request | Set to 0s | Set to 0s | Set to 0s |
| PUSCH starting position | Set to 0s | N/A | Set to 0s |
| PUSCH ending symbol | Set to 0s | N/A | Set to 0s |
| Channel Access type | Set to 0s | N/A | Set to 0s |
| Channel Access Priority Class | Set to 0s | N/A | Set to 0s |
| Modulation and coding scheme and redundancy version | N/A | Set to 1s | N/A |
| Resource block assignment and hopping resource allocation | N/A | Set to 1s | N/A |
| Modulation and coding scheme, for TB2 | N/A | N/A | Set to 1s |
| Redundancy version for TB2 | N/A | N/A | set to 1s |
| Timing offset | Set to 0s | N/A | Set to 0s |

FIG. 5B

| O1 | C8 | C7 | C6 | C5 | C4 | C3 | C2 | C1 |

FIG. 6A

| | | | | | | | | |
|---|---|---|---|---|---|---|---|---|
| O1 | C8 | C7 | C6 | C5 | C4 | C3 | C2 | C1 |
| O2 | C16 | C15 | C14 | C13 | C12 | C11 | C10 | C9 |
| O3 | C24 | C23 | C22 | C21 | C20 | C19 | C18 | C17 |
| O4 | C32 | C31 | C30 | C29 | C28 | C27 | C26 | C25 |

FIG. 6B

CONTROL OF UPLINK RADIO TRANSMISSIONS ON SEMI-PERSISTENTLY ALLOCATED RESOURCES

RELATED APPLICATIONS

This application is a continuation of prior application Ser. No. 16/492,968, filed 11 Sep. 2019, which was the National Stage of International Application No. PCT/EP2017/084049, filed 21 Dec. 2017, which claims benefit of U.S. Provisional Application No. 62/476,089, filed 24 Mar. 2017, the disclosures of which are all incorporated herein by reference in their entirety.

TECHNICAL FIELD

The present invention relates to methods for controlling radio transmissions in a wireless communication network and to corresponding devices and systems.

BACKGROUND

Wireless communication networks, such as wireless communication networks based on the LTE (Long Term Evolution) technology specified by 3GPP (3rd Generation Partnership Project), typically operate in a licensed frequency spectrum, i.e., on frequency resources which are dedicated to a certain radio technology and operator. Further, also the utilization of radio resources from an unlicensed frequency spectrum, e.g., in the 5 GHz or 3.5 GHz frequency band, may be possible. Typically, radio resources from such unlicensed frequency spectrum are shared with another operator or one or more other radio technologies. The unlicensed spectrum is used as a complement to the licensed spectrum or allows completely standalone operation.

In the LTE technology radio resources from an unlicensed frequency spectrum may be utilized on the basis of a technology referred to as "Licensed-Assisted Access" (LAA). Aspects of the LAA technology are discussed in 3GPP TR 36.889 V13.0.0 (2015-06). In the LAA technology the unlicensed spectrum is used as a complement to the licensed spectrum. Using carriers from the licensed spectrum, a UE (user equipment) connects to the network. The carriers from the licensed spectrum are also referred to as primary cell or PCell. In addition one or more additional carriers, referred to as secondary cell or SCell, from the unlicensed spectrum are used to enhance transmission capacity. For this purpose, a carrier aggregation functionality of the LTE technology is utilized. The carrier aggregation functionality allows to aggregate two or more carriers, i.e., frequency channels. In a typical LAA scenario, at least one of the aggregated carriers is from the licensed spectrum and at least one of the aggregated carriers is from the unlicensed spectrum.

Due to regulatory requirements, transmissions in the unlicensed spectrum are typically permitted only with prior channel sensing, transmission power limitations, and/or imposed maximum channel occupancy time. To take into account that the radio resources from the unlicensed spectrum are shared with other operators or other radio technologies, an LBT (listen-before-talk) procedure may need to be performed before proceeding to a transmission in the unlicensed spectrum. Typically, the LBT procedure involves sensing the carrier for a pre-defined minimum amount of time and backing off if the carrier is busy. If on the other hand the transmissions on the radio resources are coordinated in a centralized manner, like by dynamic scheduling as used in the LTE technology, performance may be significantly degraded because situations may occur where the centralized scheduling may grant a transmission, but the transmission is not possible because the carrier is busy, or situations may occur where the carrier would be free, but a transmission was not granted by the centralized scheduling. In the case of the LAA technology, this may for example effect the performance of uplink (UL) transmissions from the UE to the network. However, good performance for the UL transmissions is becoming more relevant, e.g., due to increasing usage of user-centric applications and an increasing need to push data to cloud storage.

A degradation of performance when using the LTE technology in the unlicensed spectrum may also arise from unfair competition with other radio technologies. For example, the unlicensed 5 GHz band is currently mainly used by WLAN (Wireless Local Area Network) communication according to the IEEE 802.11 standard family. According to these standards, a device can asynchronously access a given frequency channel, without requiring any centralized coordination. As compared to the LTE technology, which uses centralized scheduling, this increases the chances of gaining access to the frequency channel, in particular in congested network conditions. Accordingly, a UE which tries to gain access to a certain carrier from the unlicensed spectrum for an LAA based UL transmission will have less chances to gain access to the carrier than a WLAN device operating on a frequency channel which at least partially overlaps with this carrier.

Accordingly, there is a need for techniques which allow for efficient control of UL radio transmissions in an unlicensed spectrum.

SUMMARY

According to an embodiment of the invention, a method of controlling radio transmission in a wireless communication network is provided. According to the method, a radio device receives, from a node of the wireless communication network, control information for semi-persistent allocation of radio resources of an unlicensed frequency spectrum. Based on the control information, the radio device controls at least one UL radio transmission on the radio resources of the unlicensed frequency spectrum.

According to a further embodiment of the invention, a method of controlling radio transmission in a wireless communication network is provided. According to the method, a node of the wireless communication network semi-persistently allocates radio resources of an unlicensed frequency spectrum to a radio device. Further, the node sends, to the radio device, control information for controlling at least one UL radio transmission on the radio resources of the unlicensed frequency spectrum.

According to a further embodiment of the invention, a radio device is provided. The radio device is configured to receive, from a node of the wireless communication network, control information for semi-persistent allocation of radio resources of an unlicensed frequency spectrum. Further, the radio device is configured to, based on the control information, control at least one UL radio transmission on the radio resources of the unlicensed frequency spectrum.

According to a further embodiment of the invention, a node for a wireless communication network is provided. The node is configured to semi-persistently allocate radio resources of an unlicensed frequency spectrum to a radio device. Further, the node is configured to send, to the radio device, control information for controlling at least one UL radio transmission on the radio resources of the unlicensed frequency spectrum.

According to a further embodiment of the invention, a system is provided. The system comprises a node of a wireless communication network. Further, the system comprises a radio device. The node is configured to send control information for semi-persistent allocation of radio resources of an unlicensed frequency spectrum. The radio device is configured to receive the control information and, based on the control information, control at least one UL radio transmission on the radio resources of the unlicensed frequency spectrum.

According to a further embodiment of the invention, a computer program or computer program product is provided, e.g., in the form of a non-transitory storage medium, which comprises program code to be executed by at least one processor of a radio device. Execution of the program code causes the radio device to receive, from a node of the wireless communication network, control information for semi-persistent allocation of radio resources of an unlicensed frequency spectrum. Further, execution of the program code causes the radio device to, based on the control information, control at least one UL radio transmission on the radio resources of the unlicensed frequency spectrum.

According to a further embodiment of the invention, a computer program or computer program product is provided, e.g., in the form of a non-transitory storage medium, which comprises program code to be executed by at least one processor of a node of a wireless communication network. Execution of the program code causes the node to allocate radio resources of an unlicensed frequency spectrum to a radio device. Further, the node is configured to send, to the radio device, control information for controlling at least one UL radio transmission on the radio resources of the unlicensed frequency spectrum.

Details of such embodiments and further embodiments will be apparent from the following detailed description of embodiments.

BRIEF DESCRIPTION OF THE DRAWINGS

FIG. 5A illustrates DCI parameter settings for activation of semi-persistent allocation of radio resources in an unlicensed frequency spectrum as used in an embodiment of the invention.

FIG. 5B illustrates DCI parameter settings for activation of semi-persistent allocation of radio resources in an unlicensed frequency spectrum as used in an embodiment of the invention.

FIGS. 6A and 6B illustrate control elements which may be used in an embodiment of the invention.

DETAILED DESCRIPTION OF EMBODIMENTS

Figure 1:
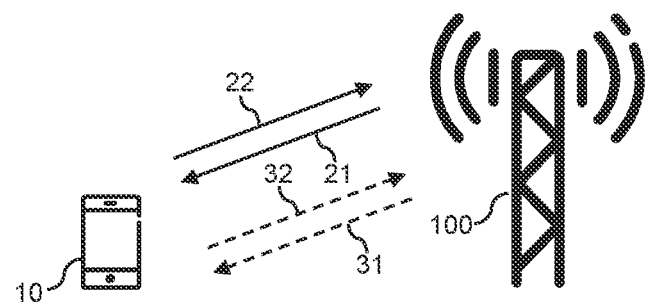
FIG. 1 schematically illustrates a wireless communication system in which radio transmissions are controlled according to an embodiment of the invention.

In the following, concepts in accordance with exemplary embodiments of the invention will be explained in more detail and with reference to the accompanying drawings. The illustrated embodiments relate to control of radio transmissions in a wireless communication network, specifically to control of UL radio transmissions from a radio device, in the following also referred to as UE. The wireless communication network is assumed to be based on a radio technology which may operate in an unlicensed frequency spectrum, such as the unlicensed 3.5 GHz or 5 GHz band. Specifically, the radio technology may be based on using the LTE radio technology in an unlicensed frequency spectrum, e.g., using the licensed-assisted access (LAA) technology as discussed in 3GPP TR 36.889 V13.0.0 (2015-06). However, it is noted that the illustrated concepts may also be applied to other technologies, e.g., a 5G (5th Generation) wireless communication technology. Further, the concepts could also be applied to standalone operation of the LTE radio technology or similar radio technology in the unlicensed frequency spectrum, without coordination or other assistance by transmissions in a licensed frequency spectrum, e.g., using MuLTEfire operation as specified in MuLTEfire Release 1.0 Technical Paper (2017-01).

In the illustrated concepts, UL radio transmissions from a UE are based on semi-persistent allocation of radio resources. As used herein, the semi-persistent allocation of radio resources refers to an allocation of radio resources which is valid in a reoccurring manner in multiple subframes, without requiring a request from the UE. However, the semi-persistent allocation of radio resources may nonetheless be controlled by the wireless communication network. Specifically, the wireless communication network may configure the semi-persistent allocation of radio resources, e.g., in terms of radio resources, and also control activation and deactivation of the semi-persistent allocation of radio resources. Accordingly, by using the semi-persistent allocation of radio resources, the radio resources can be allocated to the UE in an extended time interval starting from activation of the semi-persistent allocation of radio resources by the wireless communication network until deactivation or release of the semi-persistent allocation of radio resources. The deactivation or release of the semi-persistent allocation of radio resources may be actively initiated by the wireless communication network or triggered in an implicit manner, e.g., by lack of usage of the semi-persistently allocated radio resources. In the following, it is assumed that the semi-persistent allocation of radio resources in the unlicensed frequency spectrum is based on an SPS (semi-persistent scheduling) grant, using control information conveyed on different protocol layers, in particular on a physical control channel, on a MAC (Medium Access Control) layer, and/or on an RRC (Radio Resource Control) layer. The semi-persistent allocation of the radio resources may be used as an alternative or in addition to dynamic allocation of radio resources in response to a request from the UE.

FIG. 1 schematically illustrates an exemplary scenario in which a UE 10, e.g., a mobile phone, a tablet computer, or other kind of communication device, communicates with an access node 100 of the wireless communication network. In accordance with the assumed utilization of the LTE radio technology, the access node 100 may also be referred to as eNB ("evolved Node B"). In the scenario of FIG. 1, the communication between the UE 10 and the access node 100 is LAA based, i.e., uses carriers from both a licensed frequency spectrum and the unlicensed frequency spectrum. Specifically, a DL (downlink) carrier 21 from the licensed frequency spectrum is used for DL radio transmissions from the access node 100 to the UE 10, and a UL carrier 22 from the licensed frequency spectrum is used for UL radio transmissions from the UE 10 to the access node 100. The carriers 21, 22 may also be referred to as PCell of the UE 10. In addition, a DL carrier 31 from the unlicensed frequency spectrum may be used for DL radio transmissions from the access node 100 to the UE 10, and/or a UL carrier 32 from the unlicensed frequency spectrum may be used for UL radio transmissions from the UE 10 to the access node 100. It is noted that in some scenarios the same carrier, e.g., carrier 31 or the carrier 32, could also be used for both DL radio transmissions from the access node 100 to the UE 10 and UL radio transmissions from the UE 10 to the access node 100, e.g., by using the carrier in a TDD (Time Division Duplex) mode. The carriers 31, 32 may also be referred to as SCell of the UE 10.

Figure 2:
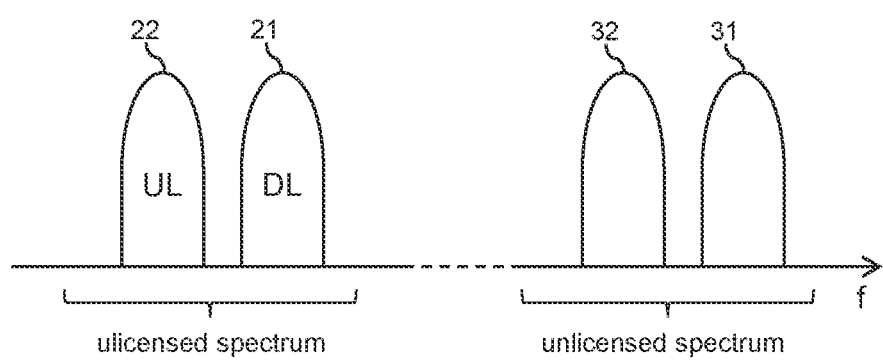
FIG. 2 illustrates utilization of radio resources from an unlicensed spectrum according to an embodiment of the invention.

FIG. 2 schematically illustrates the carriers 21, 22, 31, 32 in frequency (f) space. As illustrated, the carriers 21, 22 are in a licensed frequency spectrum, e.g., in one of the LTE bands between 700 MHz and 2.7 GHz. The carriers 21, 22, which are dedicated to the LTE radio technology and licensed to the operator of the wireless communication network, i.e., may not be used by other radio technologies or operators, may be used for reliable transmission of control information between the UE 10 and the access node 100. For example, one or more DL control channels, like a PDCCH (Physical DL Control Channel) or ePDDCH (enhanced PDDCH) may be transmitted on the DL carrier 21. Similarly, one or more UL control channels, like a PUCCH (Physical UL Control Channel) may be transmitted on the UL carrier 22. Further, the carriers may be used for transmission of a data channel. For example, one or more DL data channels, like a PDSCH (Physical DL Shared Channel) may be transmitted on the DL carrier 21. Similarly, one or more UL data channels, like a PUSCH (Physical UL Shared Channel) may be transmitted on the UL carrier 22. The PDSCH and the PUSCH are used in a shared manner by multiple UEs, and allocation of radio resources of the PDSCH or PUSCH to a certain UE, like the UE 10, is accomplished by the access node 100. The carriers 31, 32, which are shared with other operators or radio technologies, may be used for enhancing transmission capacity or transmission performance between the UE 10 and the access node 100. control information for the carriers 31, 32 may be transmitted on the carriers 21, 22, i.e., transmissions on the carriers 31, 32 are assisted by transmissions on the carriers 21, 22. The carriers 31, 32 may thus also be referred to as LAA SCell. To enhance the transmission capacity or performance, one or more DL data channels, like a PDSCH, may be transmitted on the DL carrier 31, and/or one or more UL data channels, like a PUSCH, may be transmitted on the UL carrier 32. Like in the licensed frequency spectrum, the PDSCH and the PUSCH in the unlicensed frequency spectrum are used in a shared manner by multiple UEs, and allocation of radio resources of the PDSCH or PUSCH to a certain UE, like the UE 10, is accomplished by the access node 100.

The operation as illustrated in FIGS. 1 and 2, which uses separate carriers for the DL and UL transmission direction, corresponds to an FDD (Frequency Division Duplex) mode. However, it is noted that in some scenarios DL radio transmissions and UL radio transmissions could also be performed on the same carrier, e.g., one of the carriers 21, 22, 31, 32, using different time slots for the DL radio transmissions and UL radio transmissions, e.g., using a TDD (Time Division Duplex) mode.

In the case of standalone operation using exclusively carriers from the unlicensed frequency spectrum, e.g., MuLTEfire operation, usage of the carriers 21, 22 could be omitted, and also control channels, like a PDCCH, ePDCCH, MF-sPUCCH or MF-ePUCCH, could be transmitted on the carriers 31, 32 from the unlicensed frequency spectrum.

Figure 3A:
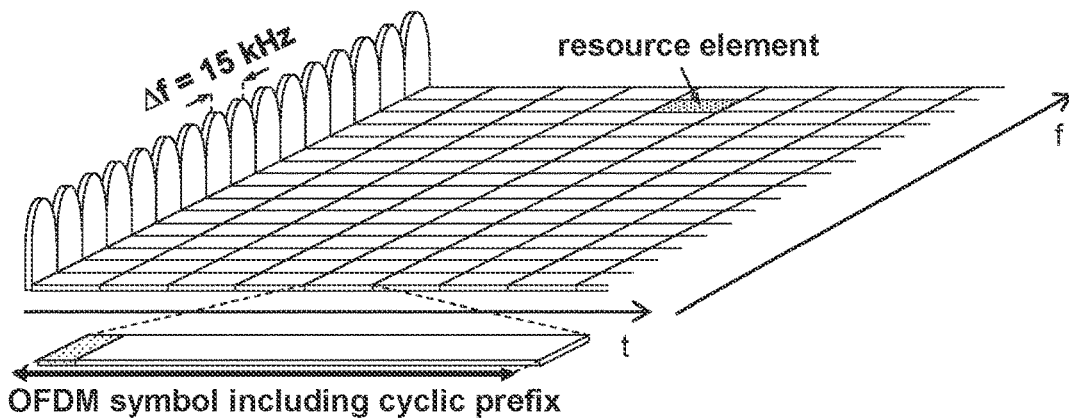
FIGS. 3A-3D illustrate allocation of radio resources according to an embodiment of the invention.

FIGS. 3A-3D illustrate the allocation of radio resources in the LTE radio technology. For the DL radio transmissions, the LTE radio technology uses OFDM (Orthogonal Frequency Division Multiplexing). As illustrated in FIG. 3A, the underlying time-frequency grid is in the frequency (f) domain defined by multiple subcarriers of 15 kHz width, and in the time (t) domain defined by a sequence of OFDM symbols forming a subframe of 1 ms duration. Each OFDM symbol starts with a cyclic prefix. A similar time-frequency grid, using the same subcarrier spacing and number of modulation symbols is used for the UL radio transmissions. For the UL radio transmissions, the LTE radio technology uses DFT (Discrete Fourier Transform) spread OFDM, also referred to as single-carrier FDMA (Frequency Division Multiple Access). Accordingly, the radio resources of the LTE radio technology can be regarded as being organized in a time-frequency grid defining resource elements each corresponding to one subcarrier during and one modulation symbol interval, e.g., as illustrated in FIG. 1.

Figure 3B:
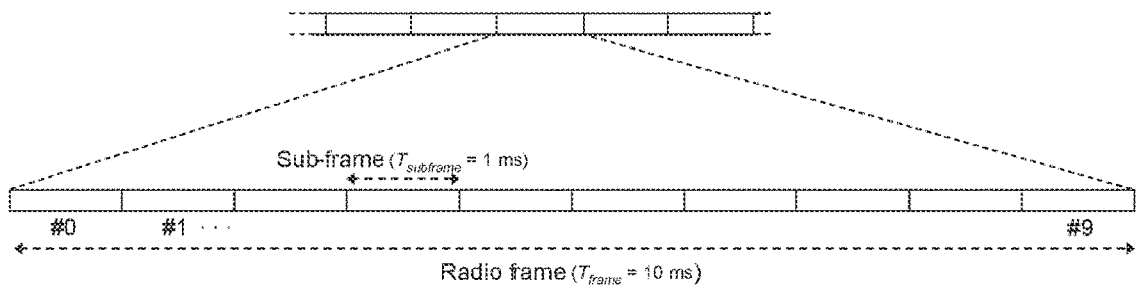

FIG. 3B further illustrates organization of the LTE radio transmissions in the time domain. As illustrated, the radio transmissions are organized in a sequence of radio frames, and each radio frame is formed of multiple subframes. The DL radio transmissions are organized in radio frames of 10 ms, and each of these radio frame consists of ten equally-sized subframes having a length Tsubframe=1 ms, as indicated in FIG. 3B. Each subframe comprises two slots which each have a duration of 0.5 ms. Within a radio frame, the slots are sequentially numbered within a range from 0 to 19. For normal cyclic prefix length, one subframe consists of 14 OFDM symbols, and the duration of each symbol is approximately 71.4 µs.

The resource allocation in LTE radio technology is typically defined in terms of resource blocks, where a resource block corresponds to one slot (0.5 ms) in the time domain and 12 contiguous subcarriers in the frequency domain. A pair of two adjacent resource blocks in time direction (1.0 ms) is also referred to as a resource block pair. The resource blocks are indexed in the frequency domain, starting with index 0 from one end of the system bandwidth.

Figure 3C:
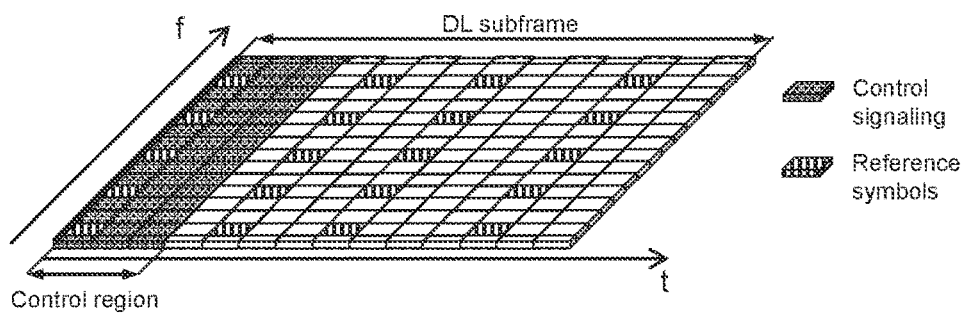

The DL radio transmissions are typically subject to dynamic scheduling. That is to say, in each subframe the access node 100 transmits DL control information (DCI). The control information indicates to which UEs data is transmitted in this subframe, and in which resource blocks include the data for a specific UE. FIG. 3C shows an example of DL subframe. As illustrated, the DCI may be transmitted in the first OFDM symbols of the DL subframe, also referred to as control region of the DL subframe. Typically, the control region corresponds to the first 1, 2, 3 or 4 OFDM symbols of the DL subframe. The number n of the OFDM symbols defining the control region is also referred to as CFI (Control Format Indicator). As illustrated, the DL subframe also contains reference symbols, which are known to the receiver and used for demodulation purposes, e.g., for coherent demodulation of the control information. In the example of FIG. 3C, CFI=3 is assumed. The reference symbols may also include cell-specific reference signals (CRSs) which may be are used to support various functions, such as fine time and frequency synchronization and channel estimation for certain transmission modes.

Figure 3D:
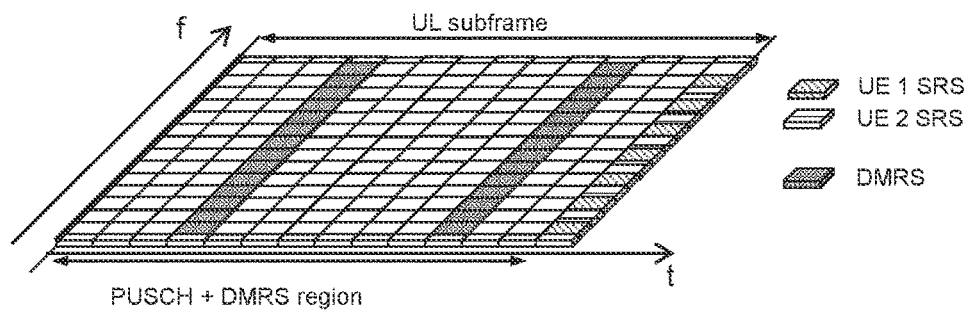

Also the UL radio transmissions are typically subject to dynamic scheduling. For this purpose, the access node 100 may indicate in the DCI information which UEs shall transmit UL data in a subsequent subframe, and in which resource blocks the UL data is to be transmitted by the UE(s). FIG. 3D shows an example of a UL subframe. The UL resource grid may include UL data and UL control information. The UL data and the UL control information may be included in a shared data channel, referred to as PUSCH (Physical UL Shared Channel). Further, the UL control information may be included in a control channel, referred to as PUCCH (Physical UL Control Channel). As further illustrated, a UL subframe may also include various reference signals, such as demodulation reference signals (DMRSs) and sounding reference signals (SRSs). DMRS are used for coherent demodulation of the PUSCH and PUCCH. The SRS are typically not associated with any data or control information and are used to estimate the UL channel quality, e.g., for purposes of frequency-selective scheduling. As illustrated in FIG. 3D, the DMRS and SRS are time-multiplexed into the UL subframe, and the SRS are transmitted in the last symbol of the UL subframe. The DMRS are typically transmitted once every slot for subframes with normal cyclic prefix, and may be located in the fourth and eleventh SC-FDMA symbols.

In the LTE radio technology, the DCI may for example indicate the following information for controlling UL radio transmissions:

radio resources allocated for a UL radio transmission (including whether frequency hopping is applied).
a modulation and coding scheme (MCS) to be applied for a UL radio transmission
redundancy versions (RV) to be applied for a UL radio transmission
a new data indicator (NDI) for controlling whether the UE shall transmit new data or perform a retransmission
a transmit power control (TPC) command
information on DMRS to be used in a UL radio transmission
in the case of cross-carrier scheduling, a target carrier index indicating a carrier to which the DCI applies.

The DCI is typically UE specific and CRC (Cyclic Redundancy Check) protected, typically using CRC bits. The UE specific character of the DCI is achieved by scrambling the CRC bits with a UE-specific identifier, e.g., a C-RNTI (Cell Radio Network Temporary Identifier). Further, the DCI and scrambled CRC bits typically protected by convolutional coding. Typically, the access node 100 assigns a unique C-RNTI to every UE associated to it. The C-RNTI can take values in the range 0001-FFF3 in hexadecimal format. When the UE 10 is simultaneously served by multiple cells, such as the above-mentioned PCell and SCell, the UE 10 will typically use the same C-RNTI on all serving cells.

The DCI may be transmitted in a DL control channel referred to as PDCCH (Physical DL Control Channel), which exclusively uses resource elements from the control region of the DL subframe. Further, DL control information may also be transmitted in a DL control channel referred to as ePDCCH, which uses resource elements outside the control region. A specific type of DL control information which may be transmitted in the PDCCH or ePDCCH is scheduling information, such as a DL assignment, allocating DL radio resources for a DL radio transmission to the UE 10, or a UL grant, allocating UL radio resources for a UL radio transmission from the UE 10.

The dynamic scheduling of UL radio transmissions may be accomplished in the following manner: The UE 10 reports to the access node 100 when it needs to transmit UL data, e.g., by sending a scheduling request (SR). In response to the SR, the access node 100 allocates the radio resources and sends corresponding scheduling information in an UL grant to the UE 10. If the allocated radio resources are not sufficient to transmit all the UL data, the UE 10 may further send a buffer status report (BSR) on the allocated radio resources, thereby informing the access node 100 about the amount of UL data still pending for transmission. In response to the BSR, the access node 100 may allocate further radio resources to the UE 10, so that the UE 10 can continue with the transmission of the UL data.

In more detail, if the UE's buffer 10 for UL data to be transmitted is empty and new UL data arrives in the buffer, dynamic scheduling may be performed according to the following procedure:

1. Using the PUCCH, the UE 10 sends a SR to the access node 100. The SR informs the access node 100 that the UE 10 needs to transmit UL data. For sending the SR, the UE 10 may utilize a timeslot which is allocated according to a periodic schedule, e.g., with an interval of 5, 10, or 20 ms.
2. When the access node 100 receives the SR, it responds with a small UL grant that allocates radio resources which are just sufficient to indicate the amount of UL data pending in the buffer by a BSR. This reaction to the SR typically takes 3 ms.
3. After the UE 10 received and processed the initial UL grant, which may take about 3 ms, it typically sends an UL radio transmission with the BSR. The BSR is a CE (Control Element) of a MAC (Medium Access Control) protocol of the LTE radio technology. If the initial UL grant is big enough, the UE 10 may also include at least a part of the UL data into the UL radio transmission.
4. Upon receiving the BSR, the access node 100 allocates radio resources in accordance with the amount of pending UL data indicated by the BSR and sends a corresponding further UL grant to the UE 10. By transmitting the pending UL data on the allocated radio resources, the UE 10 may then drain its buffer.

In the above example of a dynamic scheduling procedure, a delay of 16 ms or more can occur between arrival of the UL data in the empty buffer and reception of this UL data by the access node 100. This delay can be further increased by the UE 10 having to wait for the next opportunity to the SR and/or by the UE 10 having to perform a random access procedure to obtain synchronization and being allocated with SR opportunities.

A specific type of information which may be transmitted between the UE 10 and the access node 100 is HARQ (Hybrid Automatic Repeat Request) feedback. For a DL radio transmission from the access node 100 to the UE 10, HARQ feedback is transmitted in a UL radio transmission and indicates whether the DL radio transmission was successfully received by the UE 10. The HARQ feedback may be transmitted the PUCCH. Successful reception is confirmed by a positive HARQ acknowledgement (HARQ ACK). Unsuccessful reception is indicated by a negative HARQ acknowledgement (HARQ NACK). A HARQ NACK or the lack of a HARQ ACK may trigger a retransmission of the DL radio transmission. For a UL radio transmission from the UE 10 to the access node 100, HARQ feedback is transmitted in a DL radio transmission and indicates whether the UL radio transmission was successfully received by the access node 100. The HARQ feedback may be transmitted explicitly on a PHICH (Physical HARQ Indicator Channel) or included implicitly in DCI for future UL radio transmissions. Again, successful reception is confirmed by a HARQ ACK. Unsuccessful reception is indicated by a HARQ NACK. A HARQ NACK or the lack of a HARQ ACK may trigger a retransmission of the UL radio transmission. By way of example, 8 or 16 HARQ processes may be used in parallel.

If the LTE radio technology is used in the FDD mode, asynchronous HARQ operation may be used for the DL radio transmissions. This means that the HARQ processes can be used in any order. For each DL radio transmission, the access node 100 may indicate a HARQ process ID and the RV in the PDCCH or ePDCCH, so that the UE 10 can identify to which HARQ process a certain DL radio transmission belongs. For the UL radio transmission, synchronous HARQ operation may be used. In this case, the UE 10 needs to use the same HARQ process number every 8 subframes. This means that each subframe is associated with a corresponding HARQ process ID, which allows the access node 100 to identify from the subframe index to which HARQ process the received UL radio transmission belongs. Further, the access node 100 can know the RV from the DCI used to send the UL grant for this UL radio transmission. For the UL radio transmissions either an adaptive HARQ mode or a non-adaptive HARQ mode may be used. In the adaptive HARQ mode, the UE 10 will not use the PHICH, but rather use the UL related DCI for controlling the HARQ retransmissions. In the non-adaptive HARQ mode, the HARQ retransmissions are in turn controlled on the basis of HARQ feedback indicated in the PHICH, and the UE 10 may perform the UL retransmission on the basis of the same parameters, e.g., resource blocks, MCS, etc., as indicated by the DCI for the initial UL radio transmission. Using synchronous HARQ operation has the effect, that there is a fixed delay between the initial UL radio transmission and the UL retransmission, also referred to as HARQ RTT round-triptime. A typical HARQ RTT corresponds to 8 subframes.

If the LTE radio technology is used in the FDD mode, one UL subframe may be used to indicate HARQ feedback for multiple DL subframes, thereby taking into account that some TDD configurations have unequal numbers of DL and UL subframes, using a PUCCH configuration which differs from the PUCCH configuration used in the FDD mode. However, it is also possible to use the same configuration of the PUCCH as in the FDD mode, by using a logical "AND" operation to group the HARQ feedback of multiple DL radio transmissions into a single HARQ ACK or HARQ NACK, indicating whether zero or more than zero blocks were received in error. In this case, a HARQ NACK would be transmitted if at least one of the DL radio transmissions was unsuccessful. This may have the effect that multiple DL retransmissions are triggered, even if only one of the corresponding initial DL radio transmissions was unsuccessful.

For UL radio transmissions of the LAA SCell, asynchronous HARQ operation may used. That is to say, UL retransmissions may not only occur one HARQ RTT after the initial transmission. This may facilitate considering that an UL retransmissions may be delayed due to LBT. For asynchronous HARQ, the UE 10 may assume that all transmitted UL radio transmissions were successful, by locally setting the HARQ status to ACK, unless it receives a HARQ NACK and an UL grant for a UL retransmission from the eNB.

In the case of MuLTEfire operation, transmission of HARQ feedback for a DL radio transmission may be accomplished as follows: After reception of the PDCCH or ePDCCH and associated PDSCH in subframe 'n', the UE 10 may prepared the associated HARQ feedback for transmission in subframe 'n+4'. The UE 10 may then transmit any pending HARQ feedback at the earliest possible UL transmission opportunity following the 'n+4' constraint, i.e., in subframe n+4 or in a later subframe. The UL transmission opportunity may be defined according to either MF-sPUCCH or MF-ePUCCH resources being available for the UE 10. When transmitting the HARQ feedback, the UE 10 may aggregate pending HARQ feedback. Accordingly, like in the above-mentioned TDD mode, the transmitted HARQ feedback may potentially include HARQ feedback for several DL radio transmissions. The pending HARQ feedback may be aggregated in a bitmap with an implicit association between an index in the bitmap and a HARQ process ID. The size of this bitmap may be configured by the access node 100. A maximum number of HARQ processes for DL radio transmissions may be 16. In the bitmap, the default status of the HARQ feedback may be NACK, and this default status can be changed only if there is an ACK available to be sent.

Transmission of HARQ feedback for a UL radio transmission in MuLTEfire operation may be accomplished in an asynchronous manner, similar to UL HARQ operation specified by 3GPP for eMTC (enhanced Machine Type Communication). Accordingly, only adaptive HARQ operation could be used, and with respect to its HARQ operation, the UE 10 may ignore any information content on the PHICH, and a UL radio retransmission may be triggered and scheduled by an UL grant included in the DCI.

Figure 4A:
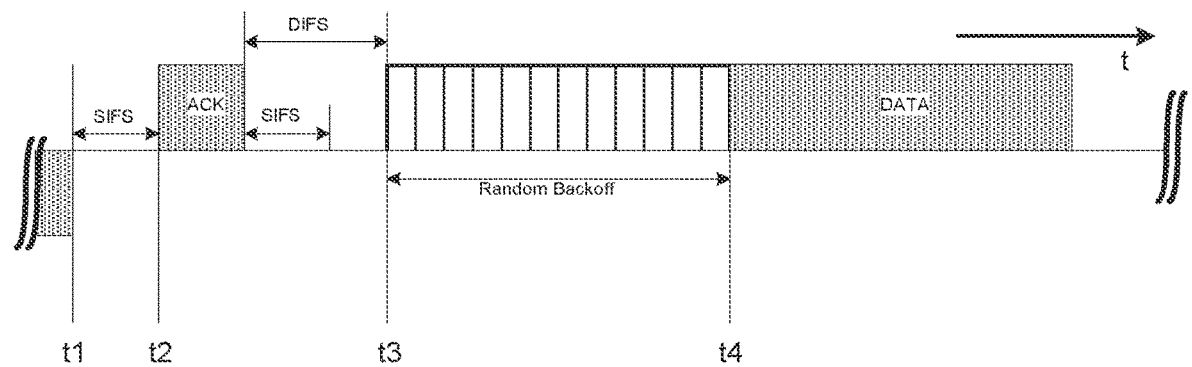
FIG. 4A schematically illustrates a collision avoidance scheme as used according to an embodiment of the invention.

For usage of the carriers 31, 32 from the unlicensed frequency band, the UE 10 and the access node 100 may need to implement an LBT procedure or similar mechanism to avoid conflicts with other radio devices or radio technologies which may potentially use the carriers 31, 32. FIG. 4A illustrates an example of an LBT procedure which may be used to ensure coexistence with WLAN transmissions on the carrier 32.

In the example of FIG. 4A, it is assumed that two WLAN stations, referred to as station A and station B, transmit on the carrier 32 from the unlicensed frequency spectrum. At time t1 station A finishes transmission of a data frame to station B. After a time termed as SIFS (Short Inter Frame Space), station B sends an ACK frame back to station A. The SIFS time may for example be 16 µs. The station B sends the ACK frame without performing a LBT operation. Before another radio device, such as the UE 10, can transmit on the carrier 32, it first needs to sense the carrier 32 to determine whether it is occupied. If it find during the transmission of the ACK frame by station B the carrier 32 is found to be occupied the other radio device needs to defer for a time referred to as DIFS (Distributed Inter Frame Space), which is longer than the SIFS time such as 34 µs. In this way, it can be prevented that the other radio device interferes with the transmission of the ACK frame. Therefore, a radio device, such as the UE 10, that wishes to transmit first performs a CCA (Clear Channel Assessment) by sensing the carrier for the DIFS time. If the medium is idle then the radio device assumes that the carrier 32 is free and that it may transmit on the carrier 32. If the carrier 32 is found to be busy, the radio device waits until the carrier 32 goes idle, and defers for the DIFS time. Further, the radio device may wait for a random backoff period before it can start to transmit on the carrier 32 at t4. The random backoff period has the purpose of reducing the risk of collisions when multiple radio devices are ready to transmit when the carrier 32 goes idle. In the example of FIG. 4A, the radio device starts a random backoff counter at t3 and defers for a corresponding number of time slots. The random backoff counter may be selected as a random integer of not more than a backoff contention window size CW. To avoid recurring collisions, the backoff contention window size CW may be doubled whenever a collision is detected, up to a limit CWmax. When a transmission attempt is successful without collision the contention window is reset back to its initial value.

Figure 4B:
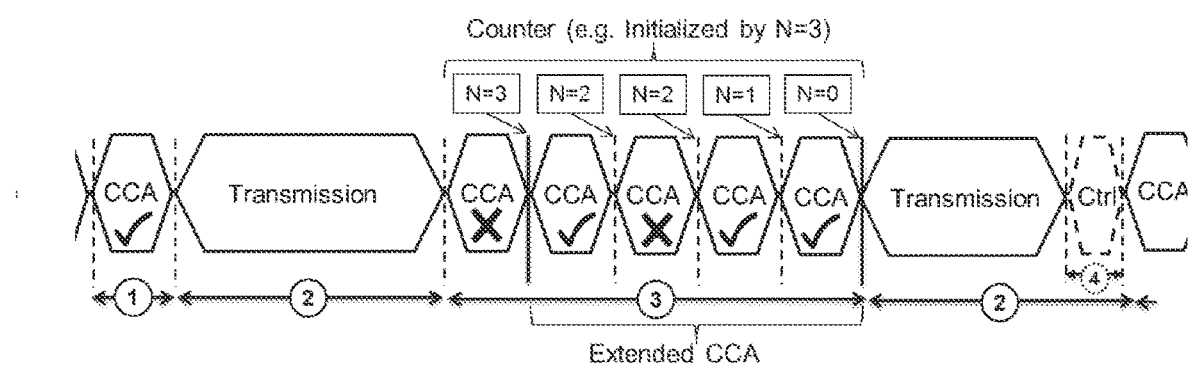
FIG. 4B schematically illustrates a further collision avoidance scheme as used according to an embodiment of the invention.

FIG. 4B illustrates a further example of an LBT procedure which is based on Load-based CCA according to ETSI Draft EN 301 893 V2.1.0 (2017-03). In this case, a radio device not using a WLAN protocol, such as the UE 10, may use load based adaptive channel access. The radio device that initiates a sequence of one or more transmissions is denoted as the Initiating Device. Otherwise, the radio device is denoted as a Responding Device. The Initiating Device implements a channel access mechanism which is based on prioritized, truncated exponential backoff. Before a transmission or a burst of transmissions on an Operating Channel, such as the carrier 32, the Initiating Device operates at least one Channel Access Engine (up to four access engines can be operated simultaneously, corresponding to different data priority classes) that executes a procedure described in step 1) to step 8) below. A single Observation Slot shall have a duration of not less than 9 µs.

1) The Channel Access Engine sets a contention window CW to a minimum value CWmin.
2) The Channel Access Engine selects a random number q from a uniform distribution over the range 0 to CW.
3) The Channel Access Engine initiates a Prioritization Period as described in step 3) a) to step 3) c):
   a) The Channel Access Engine sets p according to the priority class associated with this Channel Access Engine
   b) The Channel Access Engine waits for a period of 16 µs.
   c) The Channel Access Engine performs CCA on the Operating Channel during a single Observation Slot:
      i) The Operating Channel is considered occupied if other transmissions within this channel are detected with a level above an ED (Energy Detect) threshold. In this case, the Channel Access Engine shall initiate a new Prioritization Period starting with step 3) a) after the energy within the channel has dropped below the ED threshold.
      ii) In case no energy within the Operating Channel is detected with a level above the ED threshold, p may be decremented by not more than 1. If p is equal to 0, the Channel Access Engine shall proceed with step 4), otherwise the Channel Access Engine shall proceed with step 3) c).
4) The Channel Access Engine performs a Backoff Procedure as described in step 4) a) to step 4)d):
   a) This step verifies if the Channel Access Engine satisfies the Post Backoff condition. If q<0 and the Channel Access Engine is ready for a transmission, the Channel Access Engine shall set CW equal to CWmin and shall select a random number q from a uniform distribution over the range 0 to CW before proceeding with step 4) b).
   b) If q<1 the Channel Access Engine proceeds with step 4) d). Otherwise, the Channel Access Engine may decrement the value q by not more than 1 and the Channel Access Engine shall proceed with step 4) c).
   c) The Channel Access Engine shall perform CCA on the Operating Channel during a single Observation Slot
   d) If the Channel Access Engine is ready for a transmission the Channel Access Engine shall continue with step 5). Otherwise, the Channel Access Engine shall decrement the value q by 1 and the Channel Access Engine shall proceed with step 4) c). It should be understood that q can become negative and keep decrementing as long as the Channel Access Engine is not ready for a transmission.
5) If only one Channel Access Engine of the Initiating Device is in this stage the Channel Access Engine proceeds with step 6). If the Initiating Device has a multitude of Channel Access Engines in this stage, the Channel Access Engine with highest Priority Class in this multitude shall proceed with step 6) and all other Channel Access Engines in the current stage shall proceed with step 8).
6) The Channel Access Engine may start transmissions belonging to the corresponding or higher Priority Classes, on one or more Operating Channels.
   a) The Channel Access Engine can have multiple transmissions without performing an additional CCA on this Operating Channel providing the gap in between such transmissions does not exceed 16 µs. Otherwise, if this gap exceeds 16 µs and does not exceed 25 µs, the Initiating Device may continue transmissions provided that no energy was detected with a level above the ED threshold for a duration of one Observation Slot.
   b) The Channel Access Engine may grant an authorization to transmit on the current Operating Channel to one or more Responding Devices. If the Initiating Device issues such a transmission grant to a Responding Device, the Responding Device shall operate according to the procedure described below after Step 8.
   c) The Initiating Device may have simultaneous transmissions of Priority Classes lower than the Priority Class of the Channel Access Engine, provided that the corresponding transmission duration (Channel Occupancy Time) is not extended beyond the time that is needed for the transmission(s) corresponding to the Priority Class of the Channel Access Engine.
7) When the Channel Occupancy has completed, and it has been confirmed that at least one transmission that started at the beginning of the Channel Occupancy was successful, the Initiating Device proceeds with step 1) otherwise the Initiating Device proceeds with step 8).
8) The Initiating Device may retransmit. If the Initiating Device does not retransmit the Channel Access Engine shall discard all data packets associated with the unsuccessful Channel Occupancy and the Channel Access Engine shall proceed with step 1). Otherwise, the Channel Access Engine shall adjust CW to ((CW+1)×m)−1 with m≥2. If the adjusted value of CW is greater than CWmax the Channel Access Engine may set CW equal to CWmax. The Channel Access Engine shall then proceed with step 2).

The Responding Device may transmit either without performing a CCA, if these transmissions are initiated at most 16 µs after the last transmission by the Initiating Device that issued the grant, or it performs CCA on the Operating Channel during a single observation slot within a 25 µs period ending immediately before the granted transmission time.

For an LTE based UL radio transmissions using dynamic scheduling, the requirement for an LBT procedure or similar CCA based mechanism may have the effect that the UE 10 needs to perform an LBT procedure before it can send a SR, that the access node 100 needs to perform an LBT procedure before it can send an UL grant, and that the UE 10 needs to perform an LBT procedure before it can perform the UL radio transmission. As compared to other radio technologies which do not use dynamic scheduling, such as WLAN, this may reduce the chances of the UE 10 of gaining access to the carrier 32. Accordingly, the concepts as described herein involve using semi-persistent allocation of radio resources for the UL radio transmissions in the unlicensed frequency spectrum. Using the semi-persistent allocation of radio resources, the UE 10 can start the UL radio transmission without obtaining permission from the access node 100. In other words, as long as the semi-persistent allocation is valid, the UE 10 can immediately perform the LBT procedure to gain access to UL carrier 32, without having to transmit a SR or having to wait until it receives an UL grant from the access node 100.

In the examples as further detailed below, SPS may be used in the unlicensed spectrum, e.g., by enabling SPS for an LAA SCell or for MuLTEfire operation. RRC may be used to configure SPS for UL radio transmissions in one or more SCells in the unlicensed frequency spectrum (e.g., for LAA or MuLTEfire). Further, RRC may be used to configure SPS for UL radio transmissions in one or more PCells in the unlicensed frequency spectrum (e.g., for MuLTEfire). A corresponding SPS grant will in the following also be referred to as US-SPS grant (unlicensed spectrum SPS grant). Activation and/or release of the US-SPS grant may be signalled from the access node 100 to the UE 10 on a physical control channel, such as the PDCCH or ePDCCH, thereby ensuring fast activation or deactivation. As further explained below, this may be achieved by using DCI format 0A/4A with some fields set to special values. Further, a MAC CE may be used for confirming activation or deactivation of the SPS grant. This MAC CE may indicate for each of multiple carriers, e.g., multiple SCells or PCell and SCell, whether the US-SPS grant is active or in active, e.g., in terms of a bitmap. The MAC CE could also indicate whether an SPS grant for a carrier from the licensed spectrum is active or inactive.

To accomplish RRC based configuration of SPS in the unlicensed frequency band, an RRC message may be transmitted which includes an Information Element (IE) defining a configuration to be applied for SPS in the unlicensed frequency band. This may be achieved by modifying or supplementing the SPS-config IE as defined in section 6.3.2 of 3GPP TS 36.331 V14.1.0 (2016-12). The IE may define multiple configurations, each pertaining to a corresponding carrier from the unlicensed frequency band, e.g., to an SCell or PCell. The RRC IE may also define multiple configurations, of which at least one pertains to a corresponding carrier from the unlicensed frequency band, e.g., to an SCell and at least one pertains to a corresponding carrier from the licensed frequency band, e.g. to a PCell or SCell. Accordingly, the IE may indicate separate SPS configurations for one or more carriers, corresponding either to an SCell or to a PCell, and at least one of these carriers may be from the unlicensed frequency spectrum.

In addition or as an alternative, the RRC IE may indicate a set of one or more maximum UL burst lengths that must be observed by the UE 10 when using the radio resources allocated by the UL-SPS grant. The maximum UL burst length may be used to optimize the coexistence with other radio technologies.

In addition or as an alternative, the RRC IE may include an indication of a set of DL serving cells for which HARQ feedback and/or CSI (Channel State Information) is to be reported by using UL radio transmissions on the resources allocated by the US-SPS grant. The access node 100 can separately configure the set of DL serving cells for which to report HARQ ACK and/or CSI, e.g., to report the HARQ feedback and/or CSI according to one of the following options: using a grant-less PUSCH with UL-SCH, i.e., a data channel which is defined on the US-SPS radio resources and which also supports transmission of user-plane data, grant-less PUSCH without UL-SCH, i.e., a data channel which is defined on the US-SPS radio resources and which does not support additional transmission of user-plane data, and/or grant-less PUCCH or ePUCCH, i.e., a physical UL control channel.

In addition or as an alternative, the RRC IE may indicate one or more separate configurations to be applied for bundling of HARQ feedback in the spatial domain, time domain, and/or frequency domain, when UL control information is transmitted on a data channel defined on the US-SPS radio resources.

In addition or as an alternative, the RRC IE may indicate a configuration of time-domain, code-domain, and/or frequency-domain resource parameters for multiplexing of transmissions on an UL control channel defined on the US-SPS radio resources.

In addition or as an alternative, the RRC IE may indicate a UE specific LBT backoff offset: To avoid intra-cell collisions due to an aligned starting point of transmissions by different UEs sharing at least a part of the US-SPS radio resources, a UE-specific offset may be added to regular backoff required by the LBT procedure, e.g., as explained in connection with FIG. 4A or 4B, and this offset may be indicated by the RRC IE.

The US-SPS grant may be activated or released by sending control information on a physical control channel, e.g., a PDCCH or ePDCCH. The control channel may be transmitted on a PDCCH or ePDCCH of the cell (SCell or PCell) for which the US-SPS allocates the radio resources. However, it is also possible to utilize cross carrier scheduling and the send the control information on a physical control channel of another cell. For sending the control information on the physical control channel, the access node 100 may utilize DCI format 0, DCI format 0A, or DCI format 4A, as for example defined in 3GPP TS 36.212 V14.1.1 (2017-01), with some parameters or fields set to special values. If the US-SPS grant is activated or deactivated by cross carrier scheduling, the DCI may include an indication of the target carrier or cell, e.g., in the carrier index field (CIF) as defined for DCI format 0A and 4A. Otherwise, the CIF does not need to be included.

To take into account that the access node 100 can activate, release or re-activate the US-SPS at any time, the UE 10 should continuously monitor the PDCCH or ePDCCH for the control information which controls activation and release of the US-SPS grant. This may be accomplished using DCI format 0A or 4A on the PDCCH or ePDCCH of the PCell if cross carrier scheduling is used, or using DCI format 0A or 4A on the PDCCH or ePDCCH of the SCell if cross carrier scheduling is not used.

The UE 10 may activate the US-SPS grant if the following conditions are met for the control information received on the physical control channel:

The CRC bits of the DCI are scrambled with either a UE specific SPS-C-RNTI, i.e., an C-RNTI specifically assigned for the purpose of SPS control, or a group SPS-RNTI which is assigned to multiple UEs and can be used for group based SPS activation for these UEs.

The NDI field is set to '0'.

The fields of the DCI are set according to the table of FIG. 5A.

In the DCI as illustrated in FIG. 5A, the access node 100, i.e., the eNB, may control the following fields:

Cyclic shift DM RS: The eNB may assign each UE with different DMRS cyclic shift.

Value of CSI request: The eNB can either set the field: to A) a fixed value, to B) "activate CSI based on higher layer configuration", or to C) "applies to first UL burst". In the case of option A), the DCI will either request the UE 10 to send DCI or not. In the case of option B) the sending of CSI by the UE 10 will be controlled by higher layer configuration, e.g., by RRC configuration. In the case of option C), the DCI requests the UE 10 to send the CSI only in the first UL burst on the US-SPS resources.

Value of SRS request: The eNB can either set the field: to A) a fixed value, to B) "activate SRS based on higher layer configuration", or to C) "applies to first UL burst". In the case of option A), the DCI will either request the UE 10 to send SRS or not. In the case of option B) the sending of SRS by the UE 10 will be controlled by higher layer configuration, e.g., by RRC configuration. In the case of option C), the DCI requests the UE 10 to send the SRS only in the first UL burst on the US-SPS resources.

Value of PUSCH start point: The eNB may set the field to A) a fixed value to defining the PUSCH start point or to B) a value which defines the PUSCH start point only for the first UL burst on the US-SPS resources.

Value of PUSCH end point: The eNB may set the field to A) a fixed value to defining the PUSCH end point or to B) a value which defines the PUSCH end point only for the first UL burst on the US-SPS resources.

Resource block assignment: Using this field the eNB may assign interlaces for the US-SPS grant according to resource allocation type 3.

Modulation and coding scheme: Using this field, the eNB may define the MCS to be used on the US-SPS resources. The MSB of this field is not fixed to zero. Accordingly the eNB can choose any possible MCS with RV zero, also an MCS with order of more than 4.

CIF: The eNB may use this field to indicate the carrier to which the US-SPS grant activation applies.

In addition, the eNB can trigger sending of UL control information for on the PUSCH without a data channel for user data, e.g., by setting one or more fields in the DCI to special values. For example, the eNB can achieve this by setting the channel access type and priority class field to 1s or by setting the PUSCH trigger A field to 1s.

The UE 10 may release the US-SPS grant if the following conditions are met for the control information received on the physical control channel:

The CRC bits of the DCI are scrambled with either a UE specific SPS-C-RNTI, i.e., an C-RNTI specifically assigned for the purpose of SPS control, or a group SPS-RNTI which is assigned to multiple UEs and can be used for group based SPS deactivation for these UEs.

The NDI field is set to '0'.

The fields of the DCI are set according to the table of FIG. 5B.

For confirming activation or deactivation of the US-SPS grant, the UE 10 may send a MAC message to the access node 100. Specifically, the SPS confirmation MAC CE as defined in section 6.3.1.11 of 3GPP TS 36.321 V14.1.0 (2016-12) may be modified or supplemented for this purpose, or a new MAC CE can be defined for this purpose. If the SPS confirmation MAC CE is used, it may be identified by LCID (logical channel identifier) "10101" in a header of the MAC message. If MAC CE dedicated for the purpose of US-SPS grant confirmation is used, it may be identifier by another LCID assigned to MAC CEs of this type.

The MAC CE for confirming activation or deactivation of the US-SPS grant has a fixed size and consists of at least one multi-bit value. For the case that no serving cell has a ServCellIndex (serving cell index) larger than 8, the MAC CE can consist of a single octet defining eight fields. Otherwise the MAC CE may consist of four octets, each defining eight fields. Each field is mapped to a corresponding cell, e.g., PCell or SCell, and consists of one bit which indicates whether the US-SPS grant is activated. For example, a bit value of "1" may indicate that the US-SPS grant is activated for the corresponding cell, while a bit value of "0" indicates that the US-SPS grant is deactivated for the corresponding cell. FIG. 6A shows an example of the MAC CE for the case of using only one octet O1. FIG. 6B shows an example of the MAC CE for the case of using four octets O1, O2, O3, O4.

As illustrated, each octet includes eight values denoted by $C_i$, where i is a cell index, e.g., corresponding to the SCellIndex of an SCell. The value of $C_i$ indicates whether for the corresponding SCell the US-SPS grant is activated or deactivated, i.e., an SPS activation/deactivation status. By way of example, $C_i$ may be set to "1" to indicate that the US-SPS grant is activated for cell index i, while $C_i$ is set to "0" to indicate that the US-SPS grant is deactivated for cell index i. If no cell with cell index i is configured, the corresponding $C_i$ field may be ignored.

According to 3GPP TS 36.321 V14.1.0, LCID 10101 identifies a MAC CE with a fixed size of zero bits. In order to support this legacy behavior, the UE 10 and the access node 100 may be configured to distinguish between the case that the LCID 10101 identifies the legacy SPS confirmation MAC CE with zero length and the case that the LCID identifies the above-mentioned MAC CE consisting of at least one multi-bit value. For example, the UE 10 and the access node 100 could use a higher layer configuration procedure, e.g., RRC configuration, to select between the two cases. In this way, the UE 10 can be controlled whether to send the legacy SPS confirmation MAC CE with zero length or the above-mentioned MAC CE consisting of at least one multi-bit value. Similarly, the access node 100 can be made aware whether to expect the legacy SPS confirmation MAC CE with zero length or the above-mentioned MAC CE consisting of at least one multi-bit value.

The MAC CE for confirming activation or deactivation of the US-SPS grant may be sent on the US-SPS grant resources, e.g., on a logical data channel defined on these radio resources, such as a UL-SCH. However, the MAC for confirming activation or deactivation of the US-SPS grant could also be sent on other radio resources which are available for UL radio transmissions, e.g., dynamically scheduled radio resources. Further, it is noted that the MAC CE could also be used for confirming activation or deactivation of an SPS grant on any type of cell or carrier, including the PCell or one or more SCells in the licensed spectrum. In some scenarios, the MAC CE could be sent on the same carrier to which the US-SPS grant pertains, thereby implicitly indicating to which carrier or cell the confirmation of activation/deactivation relates. In this case, also the legacy SPS confirmation MAC CE can be used for indicating the confirmation of activation/deactivation.

It is noted that a similar MAC CE as explained above could also be used in the DL direction to control activation or release of the US-SPS grant.

Figure 7:
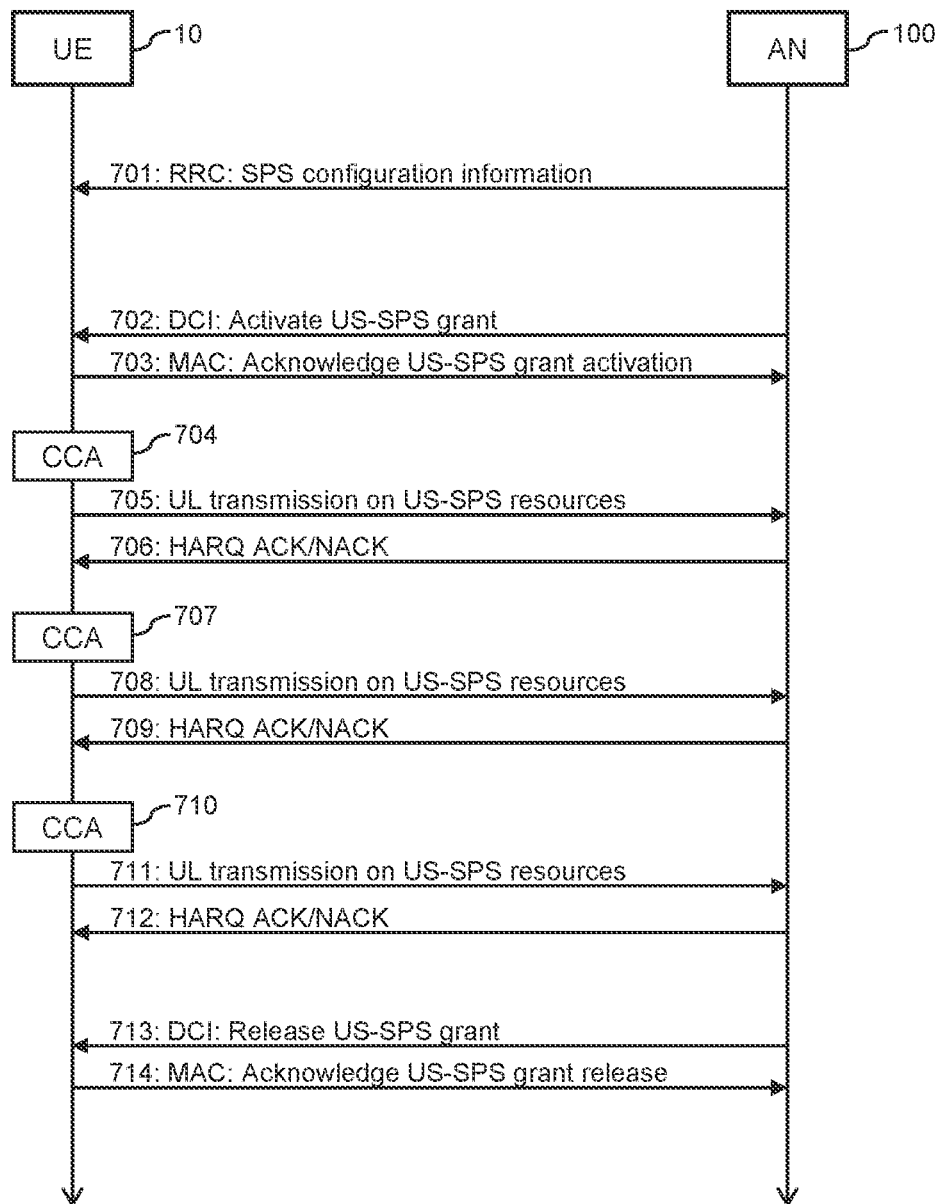
FIG. 7 illustrates an example of processes according to an embodiment of the invention.

FIG. 7 shows exemplary processes which are based on the above-described concepts. The processes of FIG. 7 involve the UE 10 and the access node (AN) 100. The UE 10 and the access node 100 are assumed to use LAA based communication or MuLTEfire based communication on one or more carriers from an unlicensed spectrum, such as the above-mentioned carrier 32.

In the processes of FIG. 7, the access node 100 sends an RRC message 701 to the UE 10. The RRC message includes SPS configuration information. For example, the SPS configuration information may indicate radio resources allocated by SPS on the carrier(s) from the unlicensed spectrum. The SPS configuration information may define separate configurations multiple carriers, e.g., corresponding either to an SCell or to a PCell, and at least one of these carriers may be from the unlicensed frequency spectrum. Further, the SPS configuration information may indicate a set of one or more maximum UL burst lengths that must be observed by the UE 10 when using the radio resources allocated by the UL-SPS grant. Further, the SPS configuration information may include an indication of a set of DL serving cells for which HARQ feedback and/or CSI (Channel State Information) is to be reported by using UL radio transmissions on the resources allocated by SPS on the carrier(s) from the unlicensed spectrum. Further, the SPS configuration information may indicate one or more separate configurations to be applied for bundling of HARQ feedback in the spatial domain, time domain, and/or frequency domain, when UL control information is transmitted on a data channel defined on the radio resources allocated by SPS on the carrier(s) from the unlicensed spectrum. Further, the SPS configuration information may indicate a configuration of time-domain, code-domain, and/or frequency-domain resource parameters for multiplexing of transmissions on an UL control channel defined on the radio resources allocated by SPS on the carrier(s) from the unlicensed spectrum. Further, the SPS configuration information may indicate a UE specific LBT backoff offset.

To activate the US-SPS grant, the access node 100 then sends DCI 702 on the PDCCH or ePDCCH. This may be accomplished as explained above, using DCI format 0A or DCI format 4A. The UE 10 then confirms activation of the US-SPS grant by sending a MAC message 703 to the access node 100. The MAC message 703 may include the above-mentioned MAC CE for confirming activation/deactivation of the US-SPS grant. The MAC CE may include at least one multi-bit value to confirm the activation status for multiple carriers.

With the US-SPS grant being activated, the UE 10 can perform UL radio transmissions on the radio resources allocated by SPS on the carrier(s) from the unlicensed spectrum, i.e., the US-SPS resources. As indicated by block 704, this involves that the UE 10 first performs CCA, and then sends an UL radio transmission 705 on the US-SPS resources. The access node 100 responds with HARQ feedback 706 to the UL radio transmission 605.

Since the US-SPS grant is valid in for radio resources which reoccur periodically, the UE 10 may perform multiple UL radio transmissions on the US-SPS resources, without requiring further scheduling by the access node 100. In the example of FIG. 7, the UE 10 again performs CCA at block 707 and then a further UL radio transmission 708 on the US-SPS resources, and the access node 100 then sends HARQ feedback 709 for the UL radio transmission 708. Further, the UE 10 again performs CCA at block 710 and then a still further UL radio transmission 711 on the US-SPS resources, and the access node 100 then sends HARQ feedback 712 for the UL radio transmission 711.

In the example of FIG. 7, the access node 100 then decides to release the US-SPS grant for the UE 10. Accordingly, the access node 100 sends DCI 713 on the PDCCH or ePDCCH to the UE 10. The DCI 713 indicates release of the US-SPS grant. The access node 100 may send the DCI 713 as explained above, using DCI format 0, DCI format 0A, or DCI format 4A. The UE 10 then confirms deactivation of the US-SPS grant by sending a MAC message 714 to the access node 100. The MAC message 714 may include the above-mentioned MAC CE for confirming activation/deactivation of the US-SPS grant. The MAC CE may include at least one multi-bit value to confirm the activation status for multiple carriers.

Figure 8:
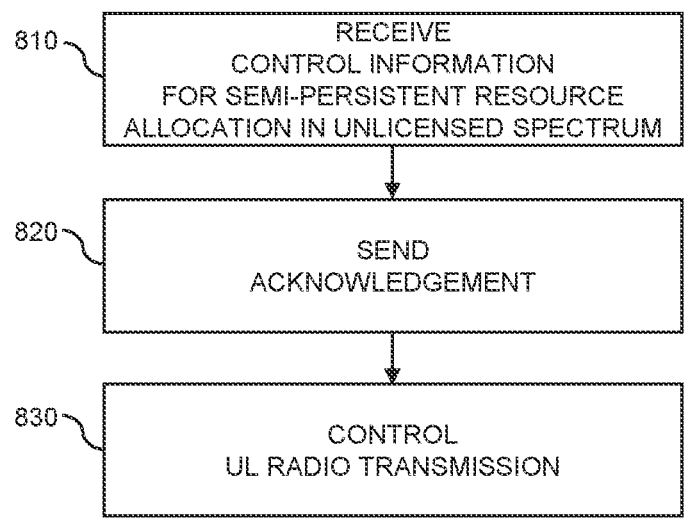
FIG. 8 shows a flowchart for schematically illustrating a method according to an embodiment of the invention.

FIG. 8 shows a flowchart for illustrating a method of controlling radio transmissions. The method of FIG. 8 may be utilized for implementing the illustrated concepts in a radio device, such as the above-mentioned UE 10. If a processor-based implementation of the radio device is used, the steps of the method may be performed by one or more processors of the radio device. In such a case the radio device may further comprise a memory in which program code for implementing the below described functionalities is stored.

At step 810, the radio device receives control information from a node of the wireless communication network. The node may correspond to an access node of the wireless communication network, such as the above-mentioned access node 100. The control information has the purpose of controlling semi-persistent allocation of radio resources of an unlicensed frequency spectrum. For example, the control information may be used for controlling the above-mentioned US-SPS grant. The radio device may receive the control information on a physical layer protocol level, e.g., on a physical control channel, such as a PDCCH or ePDCCH. Further, the radio device may receive the control information on a MAC layer protocol level, e.g., in a MAC CE. Further, the radio device may receive the control information on a higher layer protocol level, e.g., in one or more RRC messages.

The control information may define a first configuration applicable for a first UL carrier and a second configuration applicable for a second UL carrier. Accordingly, for each of multiple UL carriers, the control information may define a corresponding configuration for controlling the semi-persistent allocation of radio resources. At least one of these multiple UL carriers may be from the unlicensed frequency spectrum. The configurations may be defined by one or more messages of an RRC protocol.

Further, the control information, e.g., as received in one or more messages of an RRC protocol, may indicate at least one maximum burst length allowed for the at least one UL radio transmission on the radio resources of the unlicensed frequency spectrum.

Further, the control information, e.g., as received in one or more messages of an RRC protocol, may indicate at least one DL carrier. The at least one UL radio transmission may then include UL control information for the at least one DL carrier. One or more messages of an RRC protocol may thus be used to define a configuration of using the radio resources from the unlicensed frequency spectrum for transmission of UL control information related to a certain DL carrier. The UL control information may include HARQ feedback for one or more DL radio transmissions on the at least one DL carrier. Alternatively or in addition, wherein the UL control information may include CSI for the at least one DL carrier.

Further, the control information may indicate, e.g., as received in one or more messages of an RRC protocol, a configuration applicable for transmission of UL control information by the at least one UL radio transmission on the radio resources of the unlicensed frequency spectrum. For example, the control information could indicate a configuration applicable for bundling the UL control information in the time domain, spatial domain, and/or frequency domain. Further, the control information could indicate a configuration applicable for multiplexing different UL radio transmissions on the radio resources of the unlicensed frequency spectrum.

Further, the control information, e.g., as received in one or more messages of an RRC protocol, may indicate, a configuration applicable for multiplexing different UL control channel transmissions on the radio resources of the unlicensed frequency spectrum.

Further, the control information, e.g., as received in one or more messages of an RRC protocol, may indicate one or more parameters of an LBT procedure to be applied by the radio device for controlling the at least one UL radio transmission on the radio resources of the unlicensed frequency spectrum. Examples of such LBT procedure are explained in connection with FIGS. 4A and 4B. For example, the one or more parameters of the LBT procedure may include a backoff offset. The backoff offset may control a delay applied before starting a transmission when the radio resources were detected to be unoccupied. The backoff offset may differ from a backoff offset applied by one or more other radio devices using the radio resources of the unlicensed frequency spectrum. That is to say, the backoff offset may be set in a device-specific manner.

Further, the control information, e.g., as received on a physical control channel, such as a PDCCH or ePDCCH, may indicate activation of the semi-persistent allocation of radio resources of the unlicensed frequency spectrum.

Further, the control information, e.g., as received on a physical control channel, such as a PDCCH or ePDCCH, may indicate a cyclic shift of a demodulation reference signal to be transmitted by the radio device on the radio resources of the unlicensed frequency spectrum. The cyclic shift of the demodulation reference signal may differs from a cyclic shift applied by one or more other radio devices for transmission of a demodulation reference signal on the radio resources of the unlicensed frequency spectrum. That is to say, the cyclic shift may be device specific.

Further, the control information, e.g., as received on a physical control channel, such as a PDCCH or ePDCCH, may request the radio device to transmit one or more SRS on the radio resources of the unlicensed frequency spectrum.

Further, the control information, e.g., as received on a physical control channel, such as a PDCCH or ePDCCH, may requests the radio device to transmit one or more SRS in a first burst of the at least one UL radio transmission on the radio resources of the unlicensed frequency spectrum.

Further, the control information, e.g., as received on a physical control channel, such as a PDCCH or ePDCCH, may request the radio device to transmit CSI on the radio resources of the unlicensed frequency spectrum.

Further, the control information, e.g., as received on a physical control channel, such as a PDCCH or ePDCCH, may request the radio device to transmit CSI in a first burst of the at least one UL radio transmission on the radio resources of the unlicensed frequency spectrum.

Further, the control information, e.g., as received on a physical control channel, such as a PDCCH or ePDCCH, may indicate a start symbol of an UL data channel on the radio resources of the unlicensed frequency spectrum, e.g., a start symbol of a PUSCH.

Further, the control information, e.g., as received on a physical control channel, such as a PDCCH or ePDCCH, may indicate the start symbol of an UL data channel in a first burst of the at least one UL radio transmission on the radio resources of the unlicensed frequency spectrum, e.g., a start symbol of a PUSCH.

Further, the control information, e.g., as received on a physical control channel, such as a PDCCH or ePDCCH, may indicate an end symbol of an UL data channel on the radio resources of the unlicensed frequency spectrum, e.g., an end symbol of a PUSCH.

Further, the control information, e.g., as received on a physical control channel, such as a PDCCH or ePDCCH, may indicates an end symbol of an UL data channel in a first burst of the at least one UL radio transmission on the radio resources of the unlicensed frequency spectrum, e.g., an end symbol of a PUSCH.

Further, the control information, e.g., as received on a physical control channel, such as a PDCCH or ePDCCH, may indicate an MCS to be applied for the at least one UL radio transmission on the radio resources of the unlicensed frequency spectrum. The modulation and coding scheme may have a modulation order of more than 4.

Further, the control information, e.g., as received on a physical control channel, such as a PDCCH or ePDCCH, may indicates at least one UL carrier which provides the radio resources of the unlicensed frequency spectrum, e.g., in the above-mentioned CIF.

Further, the control information, e.g., as received on a physical control channel, such as a PDCCH or ePDCCH, may request the radio device to send UL control information on an UL data channel on the radio resources of the unlicensed frequency spectrum, e.g., on a PUSCH. The UL data channel may be configured with a logical data channel for higher layer data. For example, the data channel could be a PUSCH and be configured with a UL-SCH or without a UL-SCH.

Further, the control information, e.g., as received on a physical control channel, such as a PDCCH or ePDCCH, may indicate release of the semi-persistent allocation of radio resources of the unlicensed frequency spectrum.

At step 820, the radio device controls at least one UL radio transmission on the radio resources of the unlicensed frequency spectrum. This is accomplished based on the control information received at step 810.

At step 830, the radio device sends confirmation information to the node of the wireless communication network. The confirmation information indicates whether the semi-persistent allocation of radio resources is activated. If the semi-persistent allocation is used on multiple UL carriers, the confirmation information may indicate individually for each of the multiple UL carriers whether the semi-persistent allocation of radio resources is activated. The radio device may transmit the confirmation information in a control element of a MAC protocol, such as the above-described MAC CE for confirming activation/deactivation of the US-SPS grant. To convey the confirmation for the multiple UL carriers, the MAC CE may consist of one or more multibit values. In such multibit value, each bit may indicate the activation status of a corresponding UL carrier.

Figure 9:
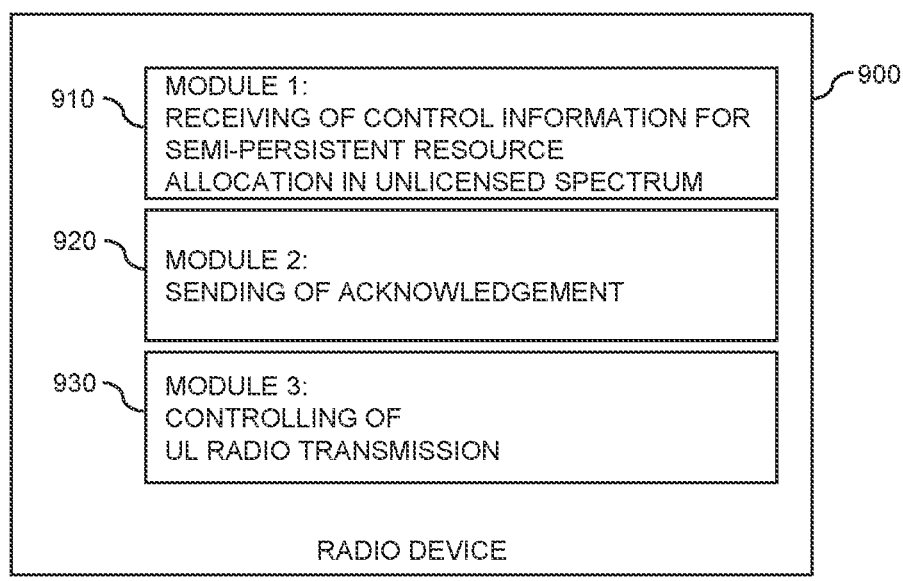
FIG. 9 shows a block diagram for illustrating functionalities of a radio device according to an embodiment of the invention.

FIG. 9 shows a block diagram for illustrating functionalities of a radio device 900 which operates according to the method of FIG. 8. As illustrated, the radio device 900 may be provided with a module 910 configured to receive control information, such as explained in connection with step 810. Further, the radio device 900 may be provided with a module 920 configured to control at least one UL radio transmission on radio resources from an unlicensed frequency, such as explained in connection with step 820. Further, radio device 900 may be provided with a module 930 configured to send confirmation information, such as explained in connection with step 830.

It is noted that the radio device 900 may include further modules for implementing other functionalities, such as known functionalities of a UE supporting the LTE radio technology. Further, it is noted that the modules of the radio device 900 do not necessarily represent a hardware structure of the radio device 900, but may also correspond to functional elements, e.g., implemented by hardware, software, or a combination thereof.

Figure 10:
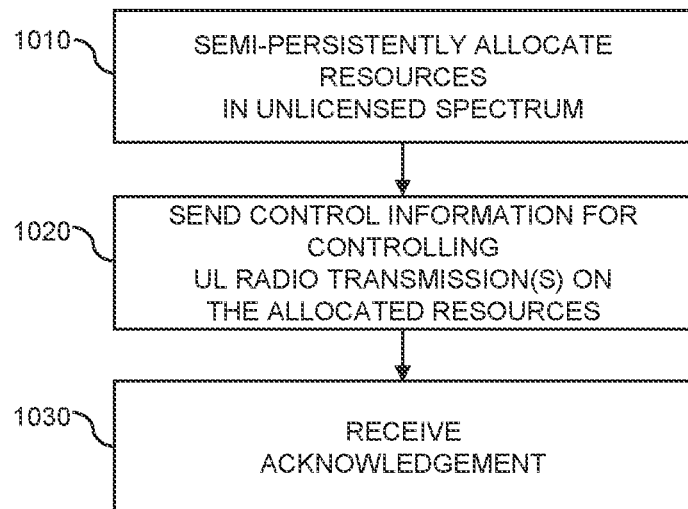
FIG. 10 shows a flowchart for schematically illustrating a further method according to an embodiment of the invention.

FIG. 10 shows a flowchart for illustrating a method of controlling radio transmissions. The method of FIG. 10 may be utilized for implementing the illustrated concepts in a node of a wireless communication network, such as the above-mentioned access node 100. If a processor-based implementation of the node is used, the steps of the method may be performed by one or more processors of the radio device. In such a case the node may further comprise a memory in which program code for implementing the below described functionalities is stored.

At step 1010, the node semi-persistently allocates radio resources of an unlicensed frequency spectrum to a radio device. The radio device may for example correspond to a UE, such as the above-mentioned UE 10.

At step 1030, the node sends control information to the radio device. The control information has the purpose of controlling at least one UL radio transmission on the radio resources of the unlicensed frequency spectrum. For example, the control information may be used for controlling the above-mentioned US-SPS grant. The node may send the control information on a physical layer protocol level, e.g., on a physical control channel, such as a PDCCH or ePDCCH. Further, the radio device may receive the control information on a MAC layer protocol level, e.g., in a MAC CE. Further, the radio device may receive the control information on a higher layer protocol level, e.g., in one or more RRC messages.

The control information may define a first configuration applicable for a first UL carrier and a second configuration applicable for a second UL carrier. Accordingly, for each of multiple UL carriers, the control information may define a corresponding configuration for controlling the semi-persistent allocation of radio resources. At least one of these multiple UL carriers may be from the unlicensed frequency spectrum. The configurations may be defined by one or more messages of an RRC protocol.

Further, the control information, e.g., as transmitted in one or more messages of an RRC protocol, may indicate at least one maximum burst length allowed for the at least one UL radio transmission on the radio resources of the unlicensed frequency spectrum.

Further, the control information, e.g., as transmitted in one or more messages of an RRC protocol, may indicate at least one DL carrier. The at least one UL radio transmission may then include UL control information for the at least one DL carrier. One or more messages of an RRC protocol may thus be used to define a configuration of using the radio resources from the unlicensed frequency spectrum for transmission of UL control information related to a certain DL carrier. The UL control information may include HARQ feedback for one or more DL radio transmissions on the at least one DL carrier. Alternatively or in addition, wherein the UL control information may include CSI for the at least one DL carrier.

Further, the control information may indicate, e.g., as transmitted in one or more messages of an RRC protocol, a configuration applicable for transmission of UL control information by the at least one UL radio transmission on the radio resources of the unlicensed frequency spectrum. For example, the control information could indicate a configuration applicable for bundling the UL control information in the time domain, spatial domain, and/or frequency domain. Further, the control information could indicate a configuration applicable for multiplexing different UL radio transmissions on the radio resources of the unlicensed frequency spectrum.

Further, the control information, e.g., as transmitted in one or more messages of an RRC protocol, may indicate, a configuration applicable for multiplexing different UL control channel transmissions on the radio resources of the unlicensed frequency spectrum.

Further, the control information, e.g., as transmitted in one or more messages of an RRC protocol, may indicate one or more parameters of an LBT procedure to be applied by the radio device for controlling the at least one UL radio transmission on the radio resources of the unlicensed frequency spectrum. Examples of such LBT procedure are explained in connection with FIGS. 4A and 4B. For example, the one or more parameters of the LBT procedure may include a backoff offset. The backoff offset may control a delay applied before starting a transmission when the radio resources were detected to be unoccupied. The backoff offset may differ from a backoff offset applied by one or more other radio devices using the radio resources of the unlicensed frequency spectrum. That is to say, the backoff offset may be set in a device-specific manner.

Further, the control information, e.g., as transmitted on a physical control channel, such as a PDCCH or ePDCCH, may indicate activation of the semi-persistent allocation of radio resources of the unlicensed frequency spectrum.

Further, the control information, e.g., as transmitted on a physical control channel, such as a PDCCH or ePDCCH, may indicate a cyclic shift of a demodulation reference signal to be transmitted by the radio device on the radio resources of the unlicensed frequency spectrum. The cyclic shift of the demodulation reference signal may differs from a cyclic shift applied by one or more other radio devices for transmission of a demodulation reference signal on the radio resources of the unlicensed frequency spectrum. That is to say, the cyclic shift may be device specific.

Further, the control information, e.g., as transmitted on a physical control channel, such as a PDCCH or ePDCCH, may request the radio device to transmit one or more SRS on the radio resources of the unlicensed frequency spectrum.

Further, the control information, e.g., as transmitted on a physical control channel, such as a PDCCH or ePDCCH, may requests the radio device to transmit one or more SRS in a first burst of the at least one UL radio transmission on the radio resources of the unlicensed frequency spectrum.

Further, the control information, e.g., as transmitted on a physical control channel, such as a PDCCH or ePDCCH, may request the radio device to transmit CSI on the radio resources of the unlicensed frequency spectrum.

Further, the control information, e.g., as transmitted on a physical control channel, such as a PDCCH or ePDCCH, may request the radio device to transmit CSI in a first burst of the at least one UL radio transmission on the radio resources of the unlicensed frequency spectrum.

Further, the control information, e.g., as transmitted on a physical control channel, such as a PDCCH or ePDCCH, may indicate a start symbol of an UL data channel on the radio resources of the unlicensed frequency spectrum, e.g., a start symbol of a PUSCH.

Further, the control information, e.g., as transmitted on a physical control channel, such as a PDCCH or ePDCCH, may indicate the start symbol of an UL data channel in a first burst of the at least one UL radio transmission on the radio resources of the unlicensed frequency spectrum, e.g., a start symbol of a PUSCH.

Further, the control information, e.g., as transmitted on a physical control channel, such as a PDCCH or ePDCCH, may indicate an end symbol of an UL data channel on the radio resources of the unlicensed frequency spectrum, e.g., an end symbol of a PUSCH.

Further, the control information, e.g., as transmitted on a physical control channel, such as a PDCCH or ePDCCH, may indicates an end symbol of an UL data channel in a first burst of the at least one UL radio transmission on the radio resources of the unlicensed frequency spectrum, e.g., an end symbol of a PUSCH.

Further, the control information, e.g., as transmitted on a physical control channel, such as a PDCCH or ePDCCH, may indicate an MCS to be applied for the at least one UL radio transmission on the radio resources of the unlicensed frequency spectrum. The modulation and coding scheme may have a modulation order of more than 4.

Further, the control information, e.g., as transmitted on a physical control channel, such as a PDCCH or ePDCCH, may indicates at least one UL carrier which provides the radio resources of the unlicensed frequency spectrum, e.g., in the above-mentioned CIF.

Further, the control information, e.g., as transmitted on a physical control channel, such as a PDCCH or ePDCCH, may request the radio device to send UL control information on an UL data channel on the radio resources of the unlicensed frequency spectrum, e.g., on a PUSCH. The UL data channel may be configured with a logical data channel for higher layer data. For example, the data channel could be a PUSCH and be configured with a UL-SCH or without a UL-SCH.

Further, the control information, e.g., as transmitted on a physical control channel, such as a PDCCH or ePDCCH, may indicate release of the semi-persistent allocation of radio resources of the unlicensed frequency spectrum.

At step 1030, the node receives confirmation information to the node of the wireless communication network. The confirmation information indicates whether the semi-persistent allocation of radio resources is activated. If the semi-persistent allocation is used on multiple UL carriers, the confirmation information may indicate individually for each of the multiple UL carriers whether the semi-persistent allocation of radio resources is activated. The node may receive the confirmation information in a control element of a MAC protocol, such as the above-described MAC CE for confirming activation/deactivation of the US-SPS grant. To convey the confirmation for the multiple UL carriers, the MAC CE may consist of one or more multibit values. In such multibit value, each bit may indicate the activation status of a corresponding UL carrier.

Figure 11:
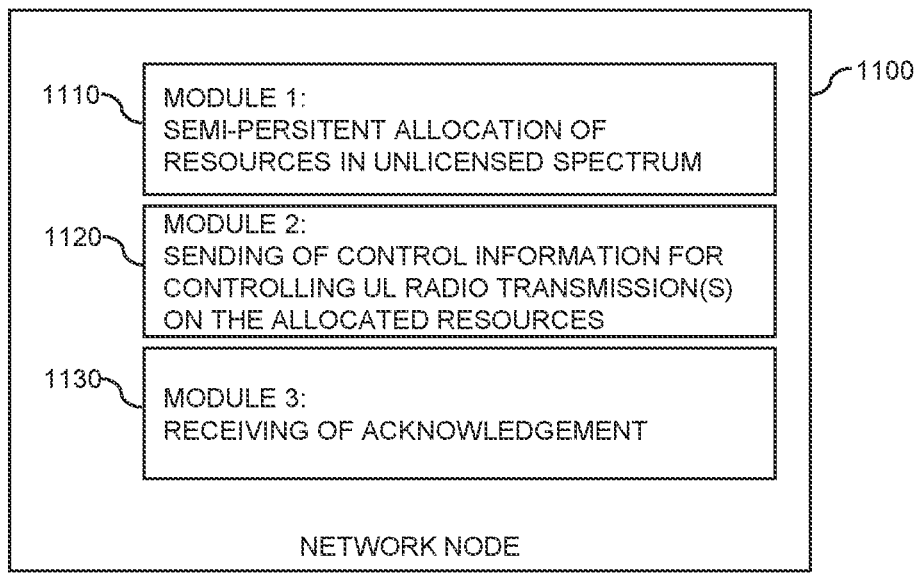
FIG. 11 shows a block diagram for illustrating functionalities of a network node according to an embodiment of the invention.

FIG. 11 shows a block diagram for illustrating functionalities of a node 1100 which operates according to the method of FIG. 10. As illustrated, the node 1100 may be provided with a module 1110 configured to semi-persistently allocate radio resources from an unlicensed frequency spectrum, such as explained in connection with step 1010. Further, the node 1100 may be provided with a module 1120 configured to send control information for controlling at least one UL radio transmission on radio resources from the unlicensed frequency, such as explained in connection with step 1020. Further, node 1100 may be provided with a module 1130 configured to receive confirmation information, such as explained in connection with step 1030.

It is noted that the node 1100 may include further modules for implementing other functionalities, such as known functionalities of a eNB of the LTE radio technology or other kind of access node. Further, it is noted that the modules of the node 1100 do not necessarily represent a hardware structure of the node 1100, but may also correspond to functional elements, e.g., implemented by hardware, software, or a combination thereof.

It is to be understood that the methods of FIGS. 8 and 10 may also be combined, e.g., in a system including a radio device operating according to the method of FIG. 8 and a node operating according the method of FIG. 10. In such system, the node could send the control information for semi-persistent allocation of radio resources of an unlicensed frequency spectrum, and the radio device could receive the control information and, based on the received control information, control at least one UL radio transmission on the radio resources of the unlicensed frequency spectrum.

Figure 12:
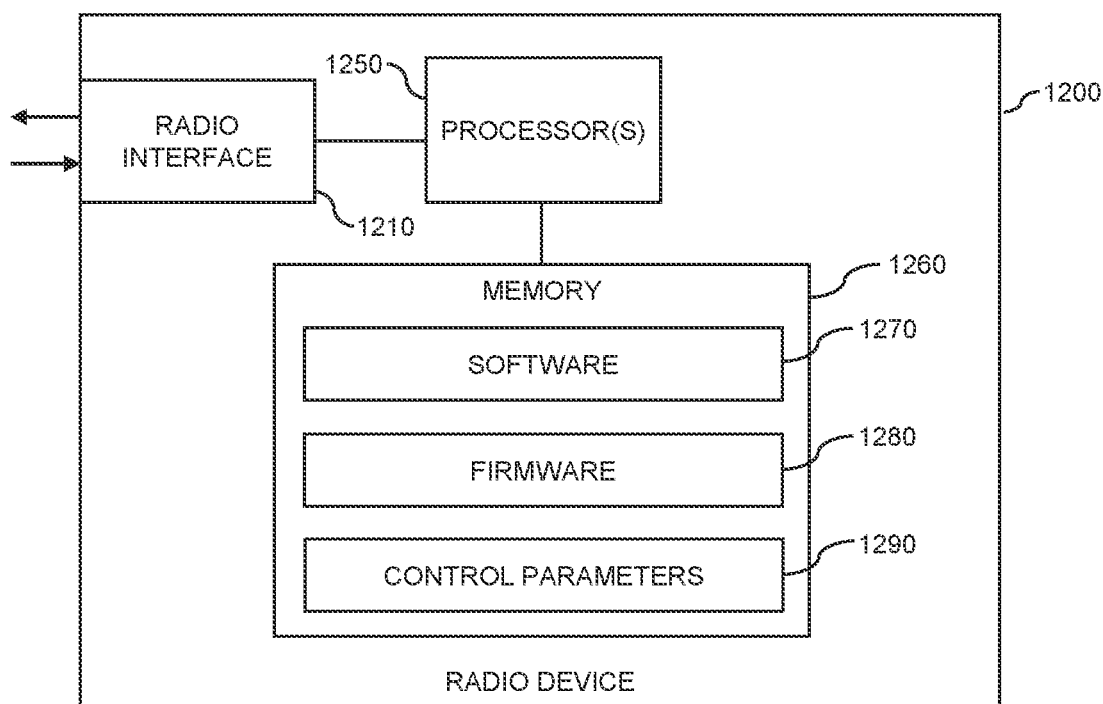
FIG. 12 schematically illustrates structures of a radio device according to an embodiment of the invention.

FIG. 12 illustrates a processor-based implementation of a radio device 1200 which may be used for implementing the above described concepts. For example, the structures as illustrated in FIG. 12 may be used for implementing the above-mentioned UE 10.

As illustrated, the radio device 1200 may include a radio interface 1210 for communicating with a wireless communication network, e.g., with an access node of the wireless communication network, such as the above-mentioned access node 100. The radio interface 1210 may be used for receiving the above-mentioned control information, for performing the above-mentioned UL radio transmissions, or for sending the above-mentioned confirmation information. The radio interface 1210 may for example be based on the LTE radio technology.

Further, the radio device 1200 may include one or more processors 1250 coupled to the radio interface 1210 and a memory 1260 coupled to the processor(s) 1250. By way of example, the radio interface 1110, the processor(s) 1250, and the memory 1260 could be coupled by one or more internal bus systems of the radio device 1200. The memory 1260 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1260 may include software 1270, firmware 1280, and/or control parameters 1290. The memory 1260 may include suitably configured program code to be executed by the processor(s) 1250 so as to implement the above-described functionalities of a radio device, such as explained in connection with FIG. 8.

It is to be understood that the structures as illustrated in FIG. 12 are merely schematic and that the radio device 1200 may actually include further components which, for the sake of clarity, have not been illustrated, e.g., further interfaces or processors. Also, it is to be understood that the memory 1260 may include further program code for implementing known functionalities of a radio device, e.g., known functionalities of a UE. According to some embodiments, also a computer program may be provided for implementing functionalities of the radio device 1200, e.g., in the form of a physical medium storing the program code and/or other data to be stored in the memory 1260 or by making the program code available for download or by streaming.

Figure 13:
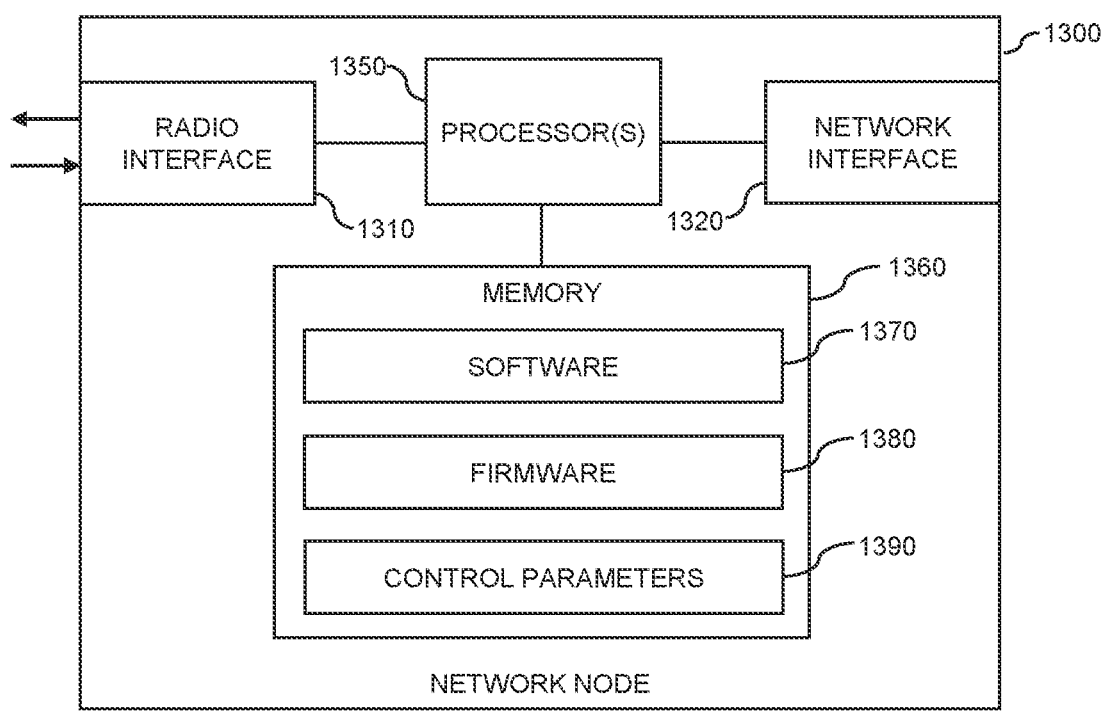
FIG. 13 schematically illustrates structures of a network node according to an embodiment of the invention.

FIG. 13 illustrates a processor-based implementation of an network node 1300 which may be used for implementing the above described concepts. For example, the structures as illustrated in FIG. 13 may be used for implementing an access node of the wireless communication network, such as the above-mentioned access node 100.

As illustrated, the network node 1300 may include a radio interface 1310 for communicating with radio devices, such as the above-mentioned UE 10 and/or other UEs. The radio interface 1310 may be used for sending the above-mentioned control information, for receiving the above-mentioned UL radio transmissions, or for receiving the above-mentioned confirmation information. The radio interface 1310 may for example be based on the LTE radio technology. Further, the network node 1300 may include a network interface 1320 for communicating with other nodes of a wireless communication network, e.g., access nodes or core network nodes.

Further, the network node 1300 may include one or more processors 1350 coupled to the interfaces 1310, 1320 and a memory 1360 coupled to the processor(s) 1350. By way of example, the interfaces 1310, 1320, the processor(s) 1350, and the memory 1360 could be coupled by one or more internal bus systems of the network node 1300. The memory 1360 may include a ROM, e.g., a flash ROM, a RAM, e.g., a DRAM or SRAM, a mass storage, e.g., a hard disk or solid state disk, or the like. As illustrated, the memory 1360 may include software 1370, firmware 1380, and/or control parameters 1390. The memory 1360 may include suitably configured program code to be executed by the processor(s) 1350 so as to implement the above-described functionalities of a network node, such as explained in connection with FIG. 10.

It is to be understood that the structures as illustrated in FIG. 13 are merely schematic and that the network node 1300 may actually include further components which, for the sake of clarity, have not been illustrated, e.g., further interfaces or processors. Also, it is to be understood that the memory 1360 may include further program code for implementing known functionalities of a network node, e.g., known functionalities of an eNB of the LTE technology or similar access node. According to some embodiments, also a computer program may be provided for implementing functionalities of the network node 1300, e.g., in the form of a physical medium storing the program code and/or other data to be stored in the memory 1360 or by making the program code available for download or by streaming.

As can be seen, the concepts as described above may be used for efficiently controlling UL radio transmissions in an unlicensed frequency spectrum. In particular, dynamic scheduling of individual UL radio transmissions can be avoided. Which may improve the performance in relation to other radio technologies coexisting in the unlicensed frequency spectrum.

It is to be understood that the examples and embodiments as explained above are merely illustrative and susceptible to various modifications. For example, the illustrated concepts may be applied in connection with various kinds of wireless communication technologies, without limitation to the above-mentioned examples of LTE, LTE LAA, or MuLTE-fire. Further, the illustrated concepts may be applied in various kinds of radio devices, including mobile phones, portable computing devices, machine type communication devices, base stations, and relay stations. Moreover, it is to be understood that the above concepts may be implemented by using correspondingly designed software to be executed by one or more processors of an existing device, or by using dedicated device hardware. Further, it should be noted that the illustrated nodes or devices may each be implemented as a single device or as a system of multiple interacting devices.

What is claimed is:

1. A method, in a radio device, of controlling radio transmission in a wireless communication network, the method comprising the radio device:
   receiving, from a node of the wireless communication network, control information for semi-persistent allocation of radio resources of an unlicensed frequency spectrum, wherein the control information defines a first configuration applicable for a first uplink carrier and a second configuration applicable for a second uplink carrier, and wherein at least one of the first uplink carrier frequency and the second uplink carrier frequency is from the unlicensed frequency spectrum;
   sending, in a control element of a Medium Access Control (MAC) protocol, unlicensed spectrum semi-persistent scheduling grant confirmation information to the node of the wireless communication network, the unlicensed spectrum semi-persistent scheduling grant confirmation information consisting of at least one multi-bit value, wherein each bit of the multi-bit value indicating individually for each of the first uplink carrier and the second uplink carrier whether semi-persistent allocation of radio resources is activated; and
   controlling, based on the control information, at least one uplink radio transmission on the radio resources of the unlicensed frequency spectrum.

2. The method of claim 1, wherein the control information indicates at least one maximum burst length allowed for the at least one uplink radio transmission on the radio resources of the unlicensed frequency spectrum.

3. The method of claim 1, wherein the control information indicates a configuration applicable for multiplexing different uplink radio transmissions on the radio resources of the unlicensed frequency spectrum.

4. The method of claim 3, wherein the control information indicates a configuration applicable for multiplexing different uplink control channel transmissions on the radio resources of the unlicensed frequency spectrum.

5. The method of claim 1, wherein the control information indicates one or more parameters of a listen-before-talk procedure to be applied by the radio device for controlling the at least one uplink radio transmission on the radio resources of the unlicensed frequency spectrum.

6. The method of claim 5, wherein the one or more parameters of a listen-before-talk procedure comprise a backoff offset.

7. The method of claim 6, wherein the backoff offset differs from a backoff offset applied by one or more other radio devices using the radio resources of the unlicensed frequency spectrum.

8. The method of claim 1, wherein the control information indicates a cyclic shift of a demodulation reference signal to be transmitted by the radio device on the radio resources of the unlicensed frequency spectrum.

9. The method of claim 8, wherein the cyclic shift of the demodulation reference signal differs from a cyclic shift applied by one or more other radio devices for transmission of a demodulation reference signal on the radio resources of the unlicensed frequency spectrum.

10. The method of claim 1, wherein the control information requests the radio device to transmit one or more sounding reference signals on the radio resources of the unlicensed frequency spectrum.

11. The method of claim 10, wherein the control information requests the radio device to transmit one or more sounding reference signals in a first burst of the at least one uplink radio transmission on the radio resources of the unlicensed frequency spectrum.

12. The method of claim 1, wherein the control information requests the radio device to transmit channel state information on the radio resources of the unlicensed frequency spectrum.

13. The method of claim 12, wherein the control information requests the radio device to transmit channel state information in a first burst of the at least one uplink radio transmission on the radio resources of the unlicensed frequency spectrum.

14. The method of claim 1, wherein the control information indicates a start symbol of an uplink data channel on the radio resources of the unlicensed frequency spectrum.

15. The method of claim 14, wherein the control information indicates the start symbol of the uplink data channel in a first burst of the at least one uplink radio transmission on the radio resources of the unlicensed frequency spectrum.

16. The method of claim 1, wherein the control information indicates an end symbol of an uplink data channel on the radio resources of the unlicensed frequency spectrum.

17. The method of claim 16, wherein the control information indicates the end symbol of the uplink data channel in a first burst of the at least one uplink radio transmission on the radio resources of the unlicensed frequency spectrum.

18. The method of claim 1, wherein the control information indicates a modulation and coding scheme to be applied for the at least one uplink radio transmission on the radio resources of the unlicensed frequency spectrum.

19. A method, in a node of a wireless communication network, of controlling radio transmission in a wireless communication network, the method comprising the node:
semi-persistently allocating radio resources of an unlicensed frequency spectrum to a radio device;
sending, to the radio device, control information for controlling at least one uplink radio transmission on the radio resources of the unlicensed frequency spectrum, wherein the control information defines a first configuration applicable for a first uplink carrier and a second configuration applicable for a second uplink carrier, and wherein at least one of the first uplink carrier frequency and the second uplink carrier frequency is from the unlicensed frequency spectrum; and
receiving, in a control element of a Medium Access Control (MAC) protocol, unlicensed spectrum semi-persistent scheduling grant confirmation information from the radio device, the unlicensed spectrum semi-persistent scheduling grant confirmation information consisting of at least one multi-bit value, wherein each bit of the multi-bit value indicating individually for each of the first uplink carrier and the second uplink carrier whether semi-persistent allocation of radio resources is activated.

20. A radio device for a wireless communication network, the radio device comprising:
a radio interface configured to perform at least one uplink radio transmission;
processing circuitry configured to cause the radio device to:
receive, from a node of the wireless communication network and via the radio interface, control information for semi-persistent allocation of radio resources of an unlicensed frequency spectrum, wherein the control information defines a first configuration applicable for a first uplink carrier and a second configuration applicable for a second uplink carrier, and wherein at least one of the first uplink carrier frequency and the second uplink carrier frequency is from the unlicensed frequency spectrum;
send, in a control element of a Medium Access Control protocol, unlicensed spectrum semi-persistent scheduling grant confirmation information to the node of the wireless communication network, the unlicensed spectrum semi-persistent scheduling grant confirmation information consisting of at least one multi-bit value, wherein each bit of the multi-bit value indicating individually for each of the first uplink carrier and the second uplink carrier whether semi-persistent allocation of radio resources is activated; and
control, based on the control information, at least one uplink radio transmission on the radio resources of the unlicensed frequency spectrum.

21. A node for a wireless communication network, the node comprising:
a radio interface configured for communication with a radio device;
processing circuitry configured to cause the node to:
semi-persistently allocate radio resources of an unlicensed frequency spectrum to the radio device;
send, to the radio device and via the radio interface, control information for controlling at least one uplink radio transmission on the radio resources of the unlicensed frequency spectrum, wherein the control information defines a first configuration applicable for a first uplink carrier and a second configuration applicable for a second uplink carrier, and wherein at least one of the first uplink carrier frequency and the second uplink carrier frequency is from the unlicensed frequency spectrum; and
receive, in a control element of a Medium Access Control (MAC) protocol, unlicensed spectrum semi-persistent scheduling grant confirmation information from the radio device, the unlicensed spectrum semi-persistent scheduling grant confirmation information consisting of at least one multi-bit value, wherein each bit of the multi-bit value indicating individually for each of the first uplink carrier and the second uplink carrier whether semi-persistent allocation of radio resources is activated.

* * * * *

UNITED STATES PATENT AND TRADEMARK OFFICE
CERTIFICATE OF CORRECTION

PATENT NO. : 11,589,377 B2
APPLICATION NO. : 17/229323
DATED : February 21, 2023
INVENTOR(S) : Karaki et al.

It is certified that error appears in the above-identified patent and that said Letters Patent is hereby corrected as shown below:

On the Title Page

On Page 2, in Item (56), under "OTHER PUBLICATIONS", in Column 2, Line 10, delete "(RRC)" and insert -- (RRC); --, therefor.

In the Drawings

In Fig. 2, Sheet 1 of 10, delete "ulicensed" and insert -- licensed --, therefor.

In Fig. 11, Sheet 9 of 10, for tag "1110", Line 2, delete "SEMI-PERSITENT" and insert -- SEMI-PERSISTENT --, therefor.

In the Specification

In Column 1, Line 8, delete "2019," and insert -- 2019 now U.S. Pat. No. 11,019,651, --, therefor.

In Column 1, Line 26, delete "Proiect)," and insert -- Project), --, therefor.

In Column 5, Line 64, delete "100. control" and insert -- 100. Control --, therefor.

In Column 7, Line 19, delete "may be are" and insert -- may be --, therefor.

In Column 7, Line 53, delete "transmission" and insert -- transmission. --, therefor.

In Column 7, Line 55, delete "transmission" and insert -- transmission. --, therefor.

In Column 7, Line 57, delete "retransmission" and insert -- retransmission. --, therefor.

In Column 7, Line 58, delete "command" and insert -- command. --, therefor.

Signed and Sealed this
Fourth Day of July, 2023

Katherine Kelly Vidal
*Director of the United States Patent and Trademark Office*

CERTIFICATE OF CORRECTION (continued)
U.S. Pat. No. 11,589,377 B2

In Column 7, Lines 59-60, delete "transmission" and insert -- transmission. --, therefor.

In Column 8, Line 1, delete "typically" and insert -- are typically --, therefor.

In Column 9, Line 11, delete "transmitted" and insert -- transmitted on --, therefor.

In Column 10, Line 9, delete "may" and insert -- may be --, therefor.

In Column 10, Line 21, delete "prepared" and insert -- prepare --, therefor.

In Column 10, Line 65, delete "a LBT" and insert -- an LBT --, therefor.

In Column 11, Line 1, delete "find" and insert -- finds --, therefor.

In Column 11, Line 2, delete "the carrier" and insert -- that the carrier --, therefor.

In Column 11, Line 54, delete "Engine" and insert -- Engine. --, therefor.

In Column 12, Line 5, delete "4)d):" and insert -- 4) d): --, therefor.

In Column 12, Line 18, delete "Slot" and insert -- Slot. --, therefor.

In Column 13, Line 54, delete "in active," and insert -- inactive, --, therefor.

In Column 14, Line 4, delete "e.g." and insert -- e.g., --, therefor.

In Column 14, Line 57, delete "and the" and insert -- and --, therefor.

In Column 15, Line 24, delete "DM RS:" and insert -- DMRS: --, therefor.

In Column 15, Line 65, delete "for on" and insert -- on --, therefor.

In Column 16, Line 25, delete "identifier" and insert -- identified --, therefor.

In Column 17, Line 36, delete "configurations" and insert -- configurations of --, therefor.

In Column 18, Line 12, delete "in for" and insert -- for --, therefor.

In Column 24, Line 31, delete "a eNB" and insert -- an eNB --, therefor.

In Column 24, Line 40, delete "according" and insert -- according to --, therefor.

In Column 25, Line 26, delete "an network" and insert -- a network --, therefor.